(12) United States Patent
Ikeda

(10) Patent No.: US 9,501,709 B2
(45) Date of Patent: Nov. 22, 2016

(54) MEDICAL IMAGE PROCESSING APPARATUS

(71) Applicant: Toshiba Medical Systems Corporation, Otawara-shi (JP)

(72) Inventor: Yoshihiro Ikeda, Sakura (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 13/771,673

(22) Filed: Feb. 20, 2013

(65) Prior Publication Data

US 2013/0223701 A1    Aug. 29, 2013

(30) Foreign Application Priority Data

Feb. 24, 2012  (JP) ................................. 2012-038712

(51) Int. Cl.
*G06K 9/00* (2006.01)
*G06K 9/46* (2006.01)
*G06T 19/00* (2011.01)

(52) U.S. Cl.
CPC ............... *G06K 9/46* (2013.01); *G06T 19/003* (2013.01); *G06T 2210/41* (2013.01)

(58) Field of Classification Search
CPC ... G06T 7/0012; G06T 15/00; G06T 19/003; G06T 2210/41; A61B 1/00009; A61B 1/05; A61B 1/041; G06K 9/46
USPC .................... 382/128, 131; 600/109; 345/419
See application file for complete search history.

(56) References Cited

U.S. PATENT DOCUMENTS 6,369,812 B1 * 4/2002 Iyriboz et al. ................. 345/419
8,103,070 B2 * 1/2012 Roberts et al. ................ 382/128
8,538,105 B2 * 9/2013 Masumoto ..................... 382/128
2003/0007673 A1 * 1/2003 Truyen et al. ................ 345/419
2004/0249270 A1   12/2004 Kondo et al.

(Continued)

FOREIGN PATENT DOCUMENTS

JP         2004-283373         10/2004
JP         2011-139767 A        7/2011

OTHER PUBLICATIONS

Combined Chinese Office Action and Search Report issued Oct. 8, 2014 in Patent Application No. 201310054323.4 (with English translation of categories of cited documents).

*Primary Examiner* — Bhavesh Mehta
*Assistant Examiner* — Ian Lemieux
(74) *Attorney, Agent, or Firm* — Oblon, McClelland, Maier & Neustadt, L.L.P.

(57) ABSTRACT

A medical image processing apparatus comprises a structure identifying part, an image generator, and a display controller. The structure identifying part identifies a tubular structure inside a subject and a core line in the axial direction of the tubular structure based on medical image data. The image generator generates medical images when viewing a predetermined observation object from a desired view point position inside the tubular structure. The display controller causes the display to display medical images. Furthermore, at each timing, the image generator identifies view point position at which the relative distance between the position of the observation object and the view point position becomes even among each of the timings, and generates a medical image from the view point position for each timing. Moreover, the display controller causes the display to display a plurality of the medical images generated for each of the timings in chronological order.

12 Claims, 27 Drawing Sheets

(56) References Cited

U.S. PATENT DOCUMENTS

| | | | |
|---|---|---|---|
| 2007/0052724 A1* | 3/2007 | Graham et al. | 345/620 |
| 2007/0120845 A1* | 5/2007 | Matsumoto | 345/419 |
| 2007/0276225 A1* | 11/2007 | Kaufman et al. | 600/416 |
| 2009/0136106 A1 | 5/2009 | Roberts et al. | |
| 2009/0169076 A1* | 7/2009 | Lobregt | A61B 5/055 382/128 |
| 2010/0041947 A1* | 2/2010 | Wendlandt et al. | 600/109 |
| 2010/0085273 A1* | 4/2010 | Nakayama | 345/1.1 |
| 2011/0018871 A1* | 1/2011 | Shirahata | 345/419 |
| 2011/0166418 A1* | 7/2011 | Aoyagi et al. | 600/109 |
| 2011/0299746 A1* | 12/2011 | Kobayashi et al. | 382/128 |

* cited by examiner

MEDICAL IMAGE PROCESSING APPARATUS

CROSS-REFERENCE TO RELATED APPLICATION

This application is based upon and claims the benefit of priority from Japanese Patent Application No. 2012-038712, filed on Feb. 24, 2012; the entire contents of which are incorporated herein by reference.

FIELD

The embodiment relates to displaying medical images based on medical data obtained using a medical imaging apparatus.

BACKGROUND

Medical image processing apparatuses exist for displaying three-dimensional image data collected by medical image diagnostic apparatuses. The medical image diagnostic apparatus herein includes an X-ray Computer tomography (CT) apparatus or Magnetic resonance Imaging (MRI) apparatus, X-ray diagnostic apparatus, ultrasound diagnostic apparatus, etc.

(Virtual Endoscopy: VE) is one method of displaying medical images based on three-dimensional image data obtained using such a medical image diagnostic apparatus.

VE is capable of displaying VE images in which an object located close to a viewpoint is displayed larger while an object located far from the viewpoint is displayed smaller. Furthermore, because VE is capable of arbitrarily setting the position or the direction of the viewpoint, regions impossible to be observed using an endoscope may also are displayed. In general, VE displays images by automatically shifting the viewpoint from the trajectory of a three-dimensional core line passing the lumen of a tubular structure such as a preliminarily extracted large intestine or esophagus. Such a method of displaying images is referred to as a fly through display. In an actual diagnosis, for example, an operator makes a diagnosis by observing VE images being updated while the viewpoint is moving in the fly through display.

DETAILED DESCRIPTION

Figure 1:
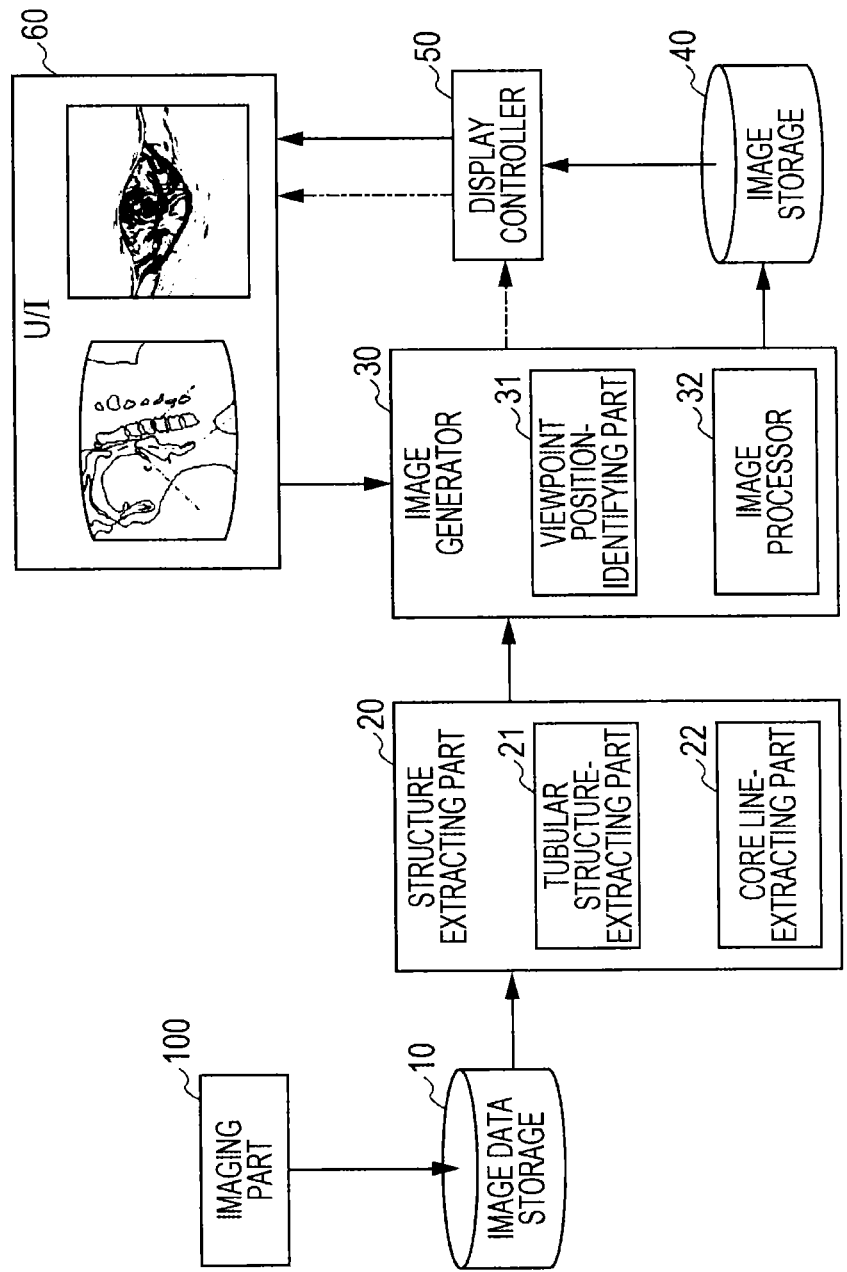
FIG. 1 is a block diagram of the medical image processing apparatus pertaining to the present embodiment.

The purpose of this embodiment is to provide a medical image processing apparatus capable of displaying an observation object at a predetermined size in a medical image, even when the position of the observation object changes due to body movements.

In order to achieve the above purpose, the first aspect of this embodiment is a medical image processing apparatus comprising an image data storage, a structure identifying part, an image generator, a display, and a display controller. The image data storage stores a plurality of medical image data obtained by imaging the inside of a subject at each point of a predetermined timing. The structure identifying part identifies a tubular structure inside the subject and a core line in the axial direction of the tubular structure based on the medical image data. The image generator generates medical images representing the inside of the tubular structure when viewing a predetermined observation object from a desired viewpoint position inside the tubular structure. The display controller causes the display to display the medical images. Furthermore, at each timing point, the image generator identifies one viewpoint position at which the relative distance between the position of the observation object and the viewpoint position becomes even among each timing point, and generates a medical image from the one viewpoint position for each timing point. Moreover, the display controller causes the display to display a plurality of the medical images generated at each timing point in chronological order.

Furthermore, the second aspect of this embodiment is a medical image processing apparatus comprising image data storage, a structure identifying part, an image generator, a display, and a display controller. The image data storage stores a plurality of medical image data obtained by imaging the inside of a subject at each timing point. The structure identifying part identifies a tubular structure inside the subject and a core line in the axial direction of the tubular structure based on the medical image data. The image generator generates medical images representing the inside of the tubular structure when viewing a predetermined observation object from a desired viewpoint position inside the tubular structure. The display controller causes the display to display the medical images. Furthermore, the image generator receives the designated position of the observation object with regard to the first medical image data corresponding to a predetermined timing, identifies one viewpoint position corresponding to the relative distance in the first medical image data, and generates a medical image from the one viewpoint position as a standard medical image. Furthermore, with regard to the second medical image data corresponding to another timing different from the predetermined timing, the image generator generates medical images while changing viewpoint positions such that the relative distance between the position of the aforementioned observation object and the aforementioned viewpoint position becomes even among each of the aforementioned timing points, and compares with the standard medical image so as to create a medical image substantially matching the standard medical image as a medical image from one viewpoint position. Moreover, the display controller causes the display to sequentially display a plurality of medical images generated for each phase.

Embodiment 1

FIG. 1 describes the structure of the medical image processing apparatus pertaining to Embodiment 1. As shown in FIG. 1, the medical image processing apparatus pertaining to the present embodiment includes image data storage 10, a structure extracting part 20, an image generator 30, an image storage 40, a display controller 50, and a U/I 60. Furthermore, the structure extracting part 20 is configured to include a tubular structure-extracting part 21 and a core line-extracting part 22. Moreover, the image generator 30 includes a viewpoint position-identifying part 31 and an image processor 32.

In the medical image processing apparatus pertaining to the present embodiment, an observation object in three-dimensional image data is designated by an operator and a fly-through image in which the observation object is displayed in a predetermined size is displayed as a motion image. Hereinafter, operations are described at each event by separating the operations into "designation of an observation object" and "generation and display of a motion image." First, operations in the event of "designation of an observation object" are described. It should be noted that the motion image in the event of "designation of an observation object" is the same as in "generation and display of a motion image" unless otherwise specifically stated.

(Designation of an Observation Object)

The image data storage 10 is storage for storing three-dimensional image data (for example, volume data) of a plurality of timing points obtained by imaging a subject in each examination by an imaging part 100. The imaging part 100 is a medical imaging apparatus capable of obtaining three-dimensional image data, for example, as with a CT, MRI, ultrasound diagnostic apparatus, etc. It should be noted that hereinafter, the three-dimensional image data is referred to as "medical image data." Furthermore, hereinafter, medical image data is described as volume data obtained by a CT.

First, the structure extracting part 20 reads medical image data corresponding to a predetermined timing (for example, the earliest timing) among medical image data of a plurality of timing points corresponding to a preliminarily designated examination (hereinafter, referred to as a "predetermined examination"). The structure extracting part 20 outputs the read medical image data to the tubular structure-extracting part 21.

The tubular structure-extracting part 21 receives the medical image data, extracts and identifies the tubular structure of a preliminarily determined tissue (that is, information indicating the structure such as the position, the size, and the orientation of the tubular structure, esophagus, blood vessels, etc.) based on the voxel data in the medical image. The tubular structure-extracting part 21 outputs information indicating the identified tubular structure to the core line-extracting part 22.

The core line-extracting part 22 receives information indicating the tubular structure from the tubular structure-extracting part 21. Based on this information, the core line-extracting part 22 extracts and identifies the core line in the axial direction inside the lumen region of the tubular structure. One method of extracting the core line includes a method in which three-dimensional thinning processing is applied to binarization data from the extracted inside region of the lumen (for example, a thinning method or a skeletonization method). Thereby, information indicating the core line (that is, the position and the orientation of the core line) is identified.

It should be noted that the structure extracting part 20 may also map the information indicating the tubular structure and the core line to a predetermined coordinate system. For example, the structure extracting part 20 regards the direction in the core line as the z axis and the plane vertical to the z axis as the xy plane. By causing such an operation, it becomes possible to identify the position inside the tubular structure. The coordinate system is one example but is not necessarily limited to this coordinate system as long as the position inside the tubular structure may be identified. Once the tubular structure and the core line are identified, the structure extracting part 20 outputs the information indicating the tubular structure and the core line to the image generator 30 by linking with medical image data corresponding to the information.

The image generator 30 receives the medical image data corresponding to a predetermined timing linked with the information indicating the tubular structure and the core line from the structure extracting part 20. The image generator 30 causes a temporary storage (not illustrated) to store the medical image data. Thereby, it becomes possible for the viewpoint position-identifying part 31 and the image processor 32 included in the image generator 30 to read the medical image data and all information linked to the data at a desired timing. Next, the image generator 30 causes the image processor 32 to generate medical images based on the received medical image data.

The image processor 32 receives instructions from the image generator 30 and reads, from the temporary storage, medical image data corresponding to the predetermined timing and information indicating the tubular structure and the core line corresponding to the data. Based on this information, while changing the position of a camera (that is, the viewpoint position) in the core line, by subjecting the medical image data that has been read together to image processing, the image processor 32 generates medical images representing the inside of the lumen of the tubular structure from each viewpoint position on the core line. Thereby, while moving the viewpoint position along the core line, a fly-through image is generated presenting the inside of the lumen corresponding to the viewpoint position.

The image processor 32 outputs the generated fly-through image to the display controller 50. The display controller 50 causes the display of the U/I60 to display the fly-through image received from the image processor 32. The U/I60 is a user interface that works as a display and operation part. Thereby, it becomes possible for the operator to designate the position of an observation object inside the tubular structure via the operation part while referring to the fly-through image that is being displayed on the display.

Figure 2A:
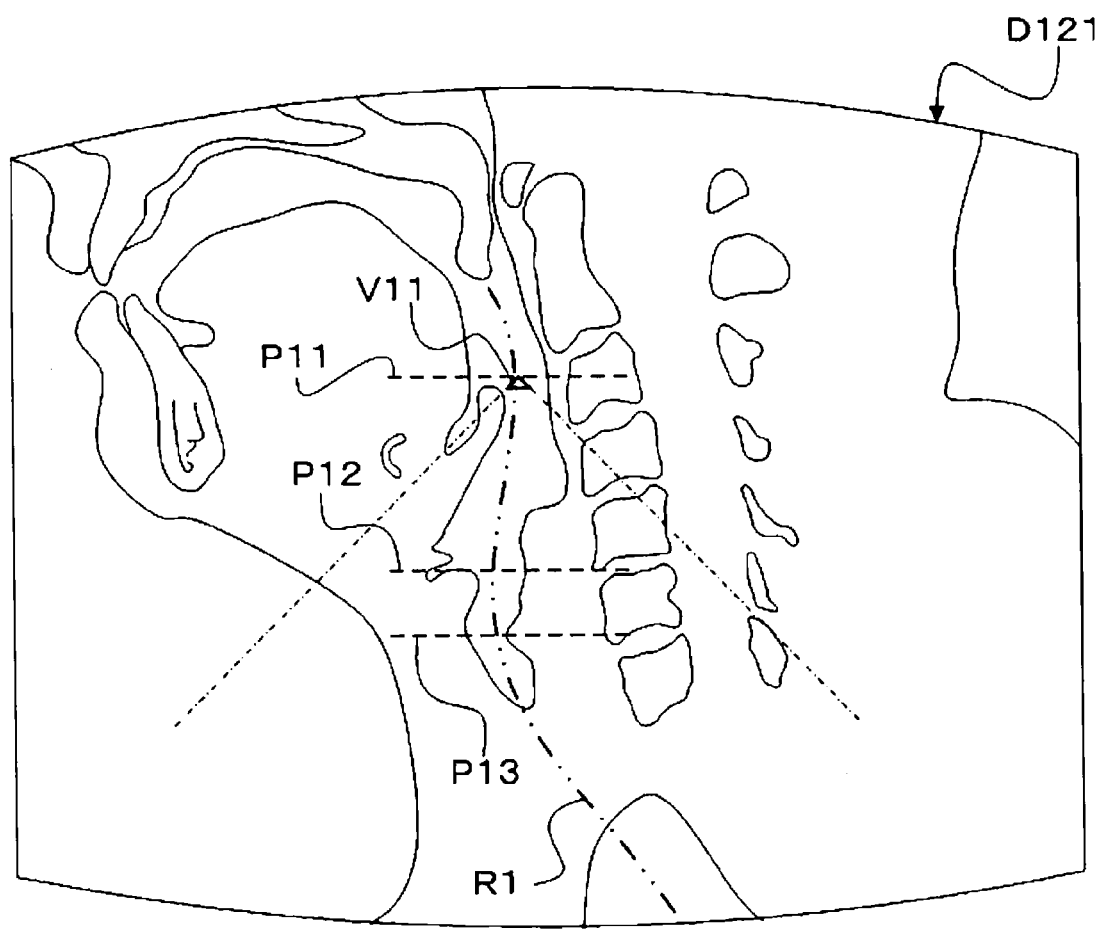
FIG. 2A is a sagittal image displaying the vicinity of the vocal cords.
Figure 2B:
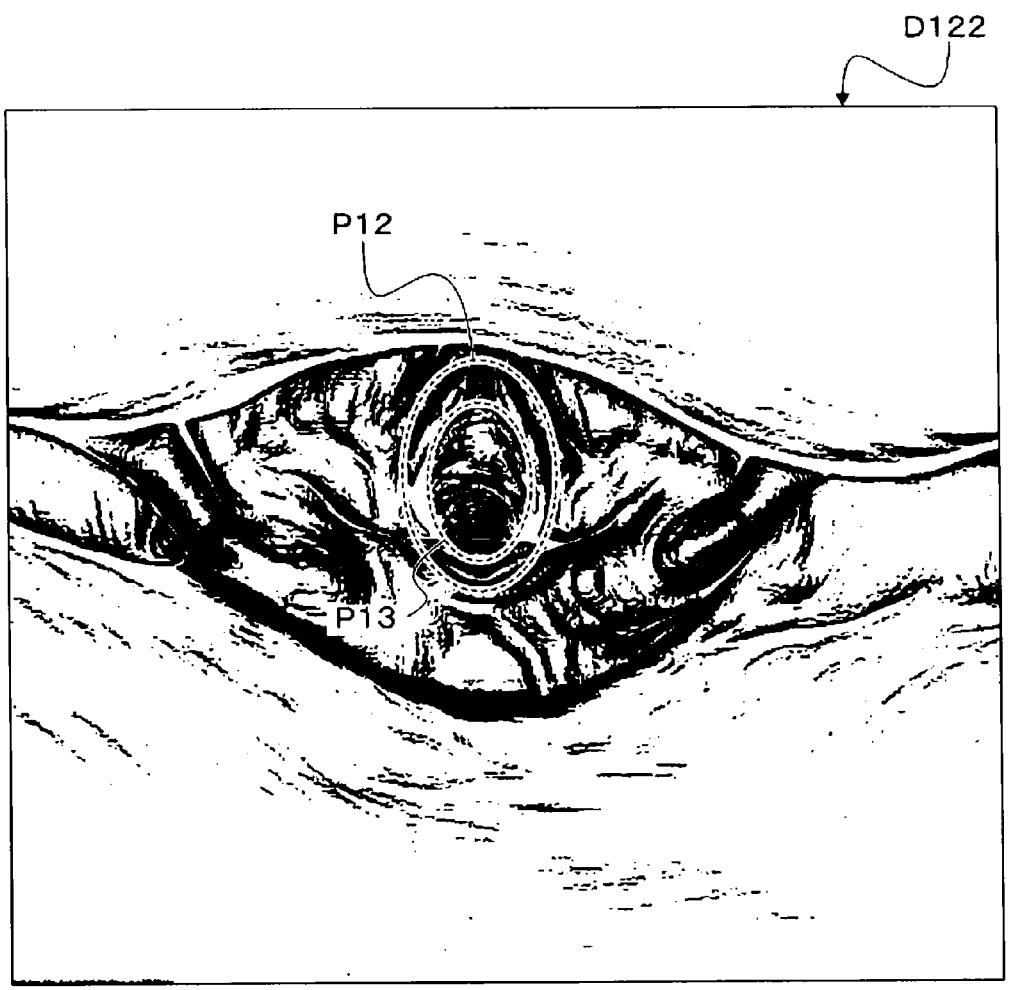
FIG. 2B is a fly-through image displaying the vicinity of the vocal cords.

Herein, FIG. 2A and FIG. 2B are used as references. The medical image D121 shown in FIG. 2A is a sagittal image in which the vicinity of the vocal cords of the head part of a subject is displayed. V11 in FIG. 2A indicates a viewpoint and R1 indicates a core line. P11 indicates the position of the viewpoint V11 (that is, a viewpoint position) and P12 indicates the position of the vocal cords in FIG. 2A. Furthermore, P13 indicates the position of the vocal cords at other timing points (FIG. 3A), described later. Moreover, the medical image D122 shown in FIG. 2B shows a fly-through image in the case of displaying the position P12 from the viewpoint position P11 in FIG. 2A. Hereinafter, a case is described in which the vocal cords displayed in the position P12 by the operator is designated as an observation object. It should be noted that although an example of displaying a fly-through image was described in order to designate an observation object, the display aspect is not limited to a fly-through image as long as the observation object can be designated. For example, the sagittal image shown in FIG. 2A or images from other angles may also be used.

The U/I60 outputs viewpoint information indicating the position (that is, positional information) of the designated observation object (specifically, the position or the region within a tubular structure) to the viewpoint position-identifying part 31 via the operation part. The viewpoint position-identifying part 31 identifies coordinates indicated by the information as the position of the observation object (hereinafter, referred to as the "object position").

Figure 4A:
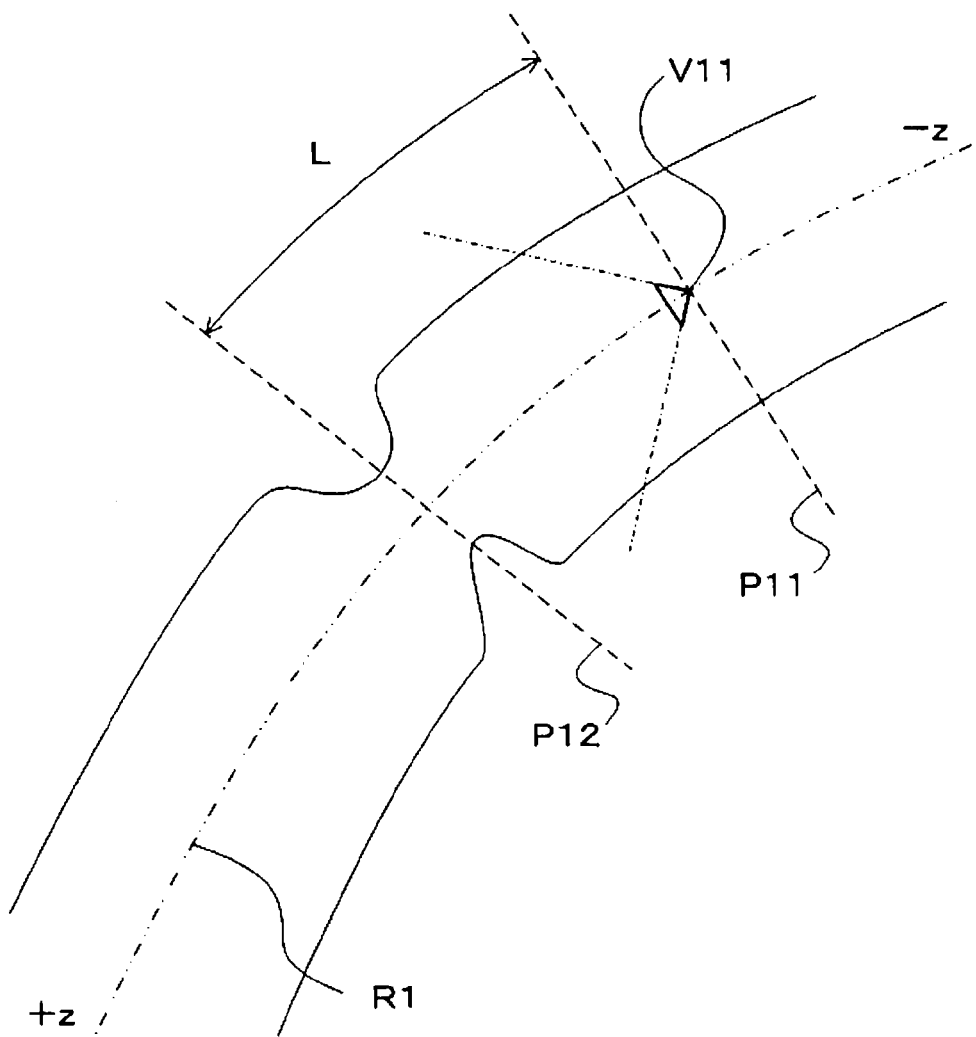
FIG. 4A is a drawing explaining one viewpoint position.

Based on the positional information of the object position, the viewpoint position-identifying part 31 identifies the viewpoint position (hereinafter, the identified viewpoint position is referred to as the "one viewpoint position") for generating a fly-through image when viewing the observation object (toward the observation object). Hereinafter, with reference to FIG. 4A, the method of identifying the one viewpoint position is described. FIG. 4A is a drawing describing the one viewpoint position. P12 in FIG. 4A indicates the object position corresponding to P12 in FIG. 2A. Moreover, R1 in FIG. 4A indicates the core line corresponding to R1 in FIG. 2A. The viewpoint position-identifying part 31 identifies the core line R1 based on information indicating the core line that has been linked to medical image data corresponding to a designated object position.

Next, the viewpoint position-identifying part 31 identifies, as the one viewpoint position P11, the position P11 separated from the object position P12 by a predetermined distance L (in other words, the position P11 is set as the one viewpoint position P11) in a predetermined direction (−z direction) in the core line R1. It should be noted that the distance L may be designated by the operator or may also be preliminarily stored in the apparatus as a fixed value. Once the one viewpoint position P11 is identified, the viewpoint position-identifying part 31 generates a medical image (that is, a fly-through image) when viewing the object position P12 from the identified one viewpoint position P11, and causes the temporary storage to store the image. It should be noted that, hereinafter, this generated medical image of the designated object position P12 is sometimes referred to as a "standard medical image." Furthermore, V11 in FIG. 4A indicates a viewpoint V11 when viewing the object position P12 from the one viewpoint position P11, and a standard medical image is generated based on the viewpoint V11. Moreover, medical image data which is the source of the generated standard medical image (generation source of the medical image in which the object position P12 is designated) is equivalent to "the first medical image data."

(Generation and Display of Motion Images)

Next, the configuration pertaining to the generation and display of motion images is described. A medical image is generated by the medical image processing apparatus pertaining to the present embodiment which identifies the one viewpoint position with regard to medical image data corresponding to another timing point different from the medical image data in which the object position P12 is designated (hereinafter, simply referred to as "another timing point"). Subsequently, a medical image when viewing an observation object from the identified one viewpoint position is generated for each timing point. As described, the medical image processing apparatus causes the display of the U/I60 to display a motion image in which the observation object is always indicated as the same size by displaying a generated medical image corresponding to each timing point in chronological order.

Figure 3A:
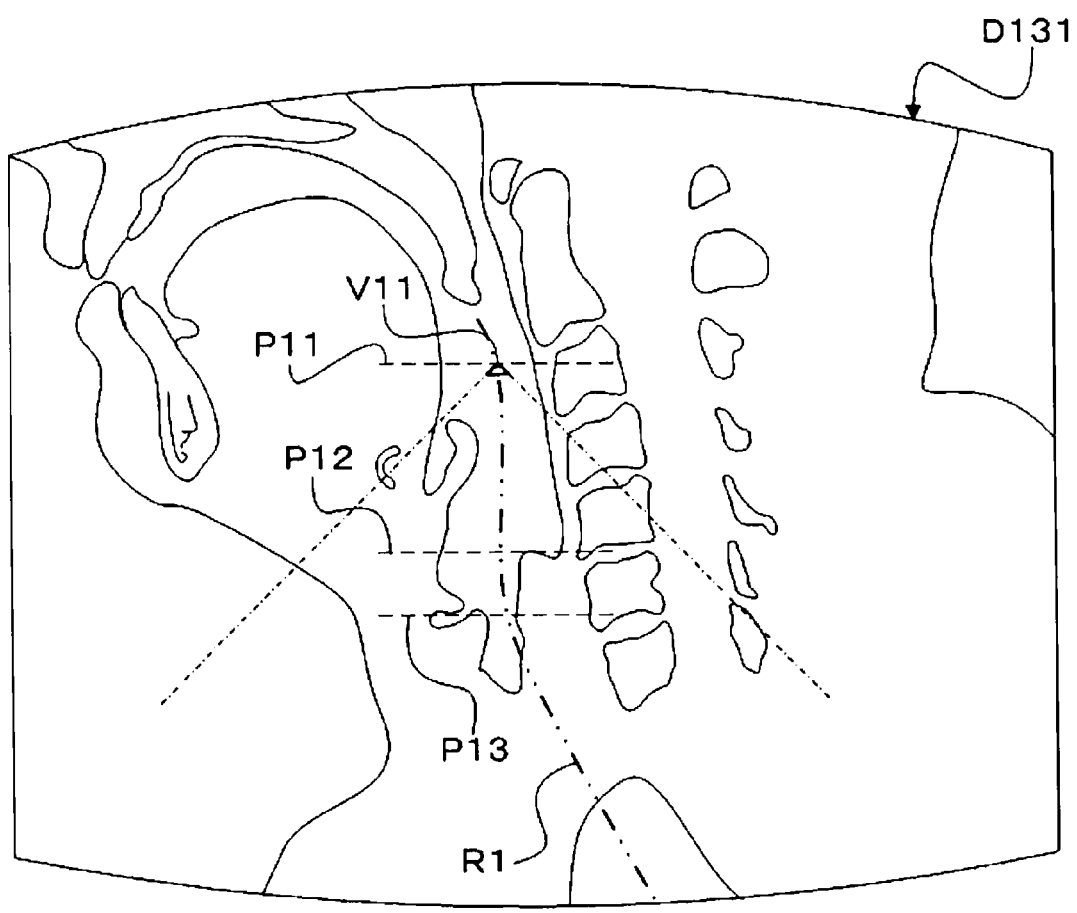
FIG. 3A is a sagittal image displaying the vicinity of the vocal cords.
Figure 3B:
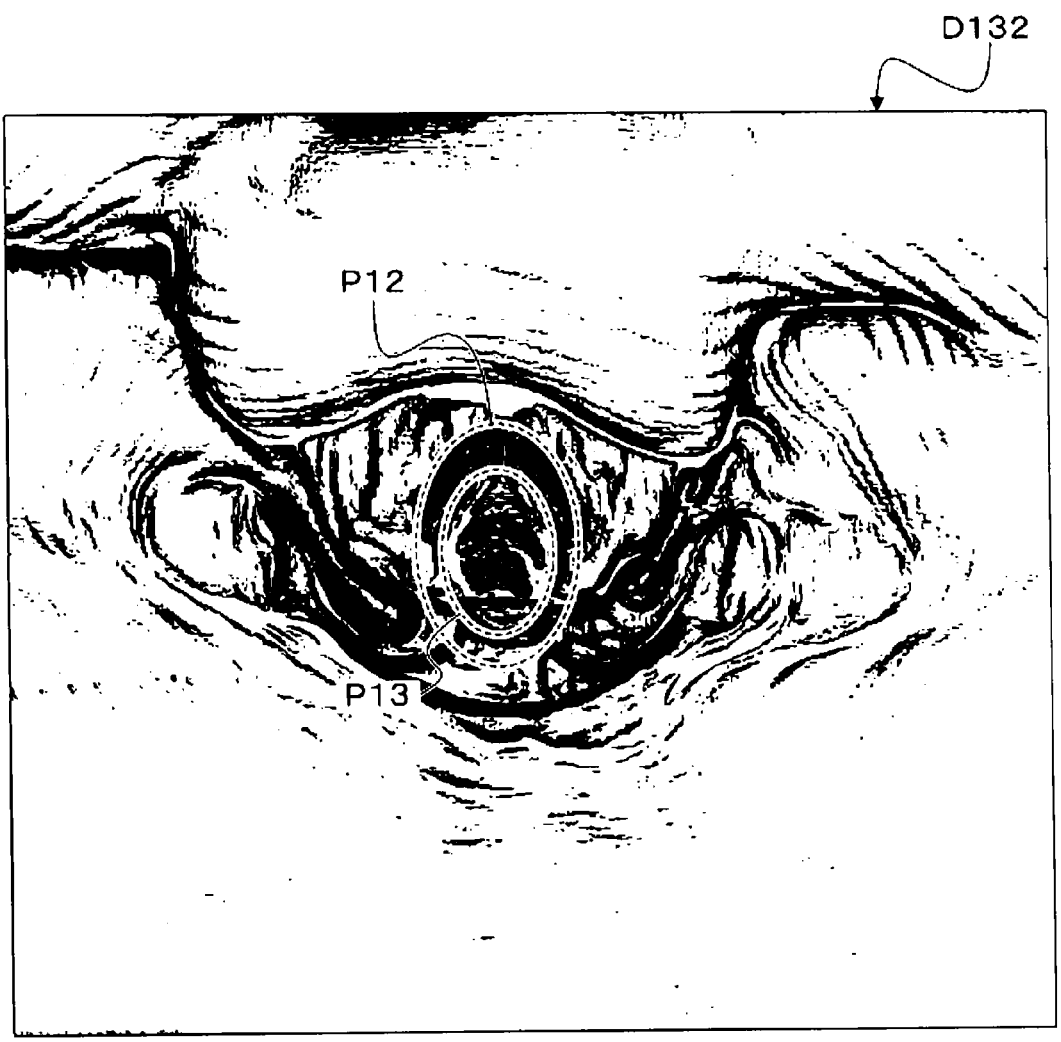
FIG. 3B is a fly-through image displaying the vicinity of the vocal cords.

Incidentally, first, before describing the operation of each configuration, the method of identifying one viewpoint position corresponding to another phase is described with reference to FIG. 2A, FIG. 2B, FIG. 3A, FIG. 3B, and FIG. 4B. The medical image D131 shown in FIG. 3A shows a sagittal image displaying the vicinity of the vocal cords, generated based on medical image data obtained in a phase that is different from FIG. 2A. V11 in FIG. 3A indicates a viewpoint arranged at the same position as in FIG. 2A while R1 indicates the core line. P11 indicates the position of the viewpoint V11 (that is, the viewpoint position) while P13 indicates the position of the vocal cords in FIG. 3A. It should be noted that P13 in FIG. 2A and FIG. 2B corresponds to the position P13 in FIG. 3A. Furthermore, P12 corresponds to the position P12 of the vocal cords in FIG. 2A and FIG. 2B. The medical image D132 shown in FIG. 3B represents a fly-through image of a case in which the position P13 is displayed from the viewpoint position P11 in FIG. 3A (in other words, a case in which the position P13 is displayed as the one viewpoint position P11). As is clear by comparing the positions P12 and P13 of the vocal cords in FIG. 2A, FIG. 2B, FIG. 3A, and FIG. 3B, the tissue inside the subject is elongated/shrunk and deformed due to body movements and sometimes the position (position on the coordinates) is changed.

Figure 4B:
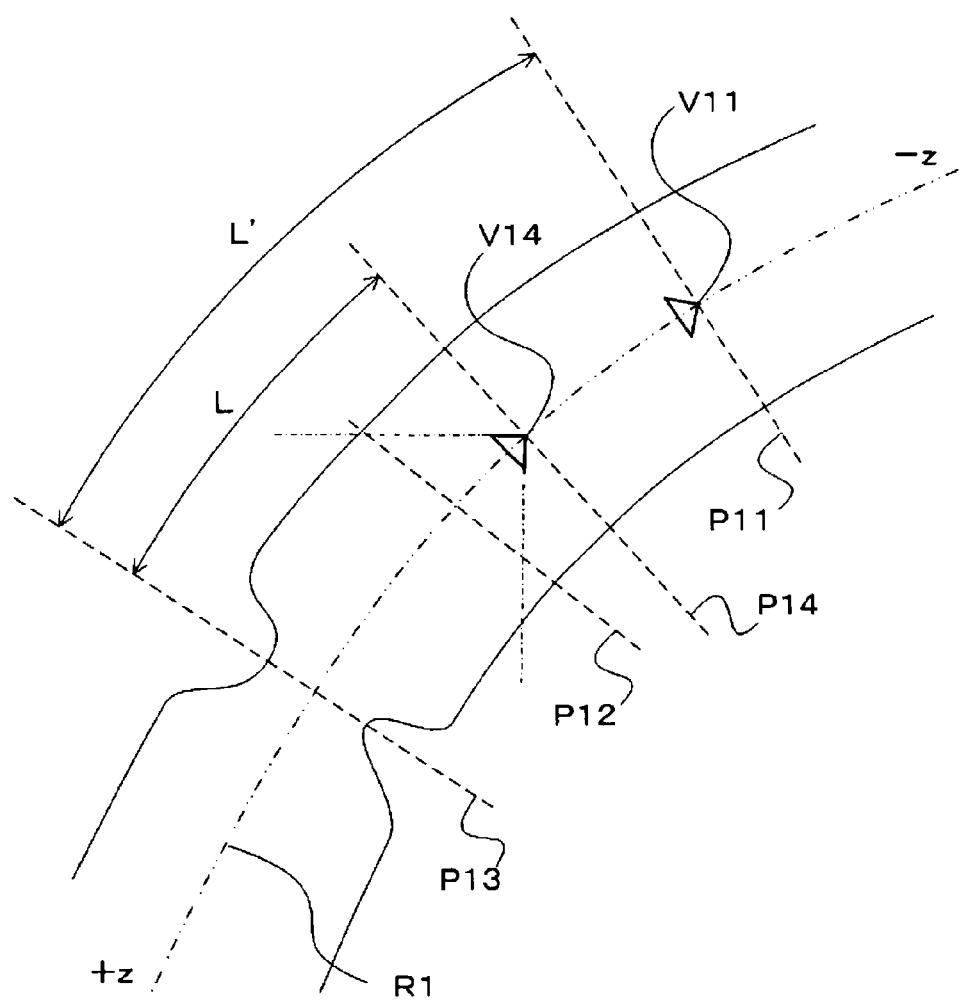
FIG. 4B is a drawing explaining a method of identifying one viewpoint position.

Herein, FIG. 4B is used as a reference. FIG. 4B is a drawing describing a method of identifying the one viewpoint position and indicates the state of another phase different from the phase in which the standard medical image is generated. V11 in FIG. 4B indicates the viewpoint at which the standard medical image is generated while P11 indicates the viewpoint position of the viewpoint V11. Furthermore, P12 indicates the object position in a phase in which the standard medical image is generated while P13 indicates the object position in the phase. Moreover, L' indicates the distance along the core line R1 from the viewpoint position P11 to the position P13, with the distance L' different from the distance L from the viewpoint position P11 to the position P12.

As described previously, the position of the observation object sometimes varies depending on the phase due to body movements. Therefore, when a medical image is generated, based on the viewpoint V11 that is fixed at the same viewpoint position P11 among each of the phases, as shown in FIG. 2B and FIG. 3B, due to the distance difference from the one viewpoint position to the object position (L'≠L), the observation object is displayed in different sizes among the phases. Therefore, when an observation object (for example, vocal cords) is displayed from the same viewpoint V11 in a plurality of phases, as shown in FIG. 2B and FIG. 3B, because the size of the observation object in a medical image changes in the phases due to the distance difference, sometimes the movement of the observation object itself becomes difficult to observe.

Incidentally, with regard to medical image data corresponding to other phases different from the medical image data in which the object position P12 is designated, the medical image processing apparatus pertaining to the present embodiment identifies the one viewpoint position such that the distance between the object position and the one viewpoint position becomes equal to the distance in the case of a standard medical image. Specifically, as shown in FIG. 4B, the position P14 of the distance L is identified, as one viewpoint position, along the core line from the object position P13. The viewpoint V14 indicates the viewpoint for displaying the object position P13 from the one viewpoint position P14. As described, in the medical image processing apparatus pertaining to the present embodiment, with regard to medical image data corresponding to another phase, the one viewpoint position P14 is identified such that the distance along the core line from the object position P13 becomes equal to the distance L in the case when a standard medical image is generated. As described, by identifying the one viewpoint position P14 in a plurality of phases and generating a medical image in which the object position P13 from the one viewpoint position P14 is displayed, it becomes possible to display an observation object (for example, vocal cords) always in the same size among a plurality of phases.

Next, the operations of each configuration are described focusing on the process related to identifying the one viewpoint position with respect to medical image data of another phase.

When a standard medical image is generated, the image generator 30 instructs the structure extracting part 20 to identify a tubular structure and a core line in the same examination as medical image data corresponding to the standard medical image with regard to medical image data obtained in another phase different from the aforementioned data. Once these instructions are received, the structure extracting part 20 reads medical image data corresponding to another phase from the image data storage 10, and causes the tubular structure-extracting part 21 and the core line-extracting part 22 to identify the tubular structure and the core line in the medical image data. Once the tubular structure and the core line are identified, the structure extracting part 20 outputs information indicating the tubular structure and the core line to the image generator 30 by linking with medical image data corresponding to the information. In this way, with regard to the medical image data corresponding to all phases in the examination, the structure extracting part 20 identifies the tubular structure and the core line, and outputs the information to the image generator 30 by linking with the corresponding medical image data.

The image generator 30 consecutively receives medical image data corresponding to the other phase to which information indicating the tubular structure and the core line has been linked from the structure extracting part 20. The image generator 30 outputs the information and the medical image data to the image processor 32.

When the information indicating the tubular structure and the core line as well as the medical image data is received, the image processor 32 consecutively generates medical images (that is, fly-through images) when viewing the inside of the tubular structure from the viewpoint while changing the position of the viewpoint along the core line and outputs the medical images to the viewpoint position-identifying part 31.

The viewpoint-identifying part 31 receives medical images corresponding to each viewpoint on the core line from the image processor 32. The viewpoint position-identifying part 31 compares the received medical images to a standard medical image that has been temporarily stored in the storage. Then, the viewpoint position-identifying part 31 detects an area that has characteristics in its form such as irregularities (hereinafter, referred to as "form characteristics) with regard to each of the medical images, making it possible to verify whether the form characteristics match between two medical images. As described, the viewpoint position-identifying part 31 identifies a medical image matching the standard medical image from medical images corresponding to each viewpoint transmitted from the image processor 32. In other words, the viewpoint position-identifying part 31 ends up identifying, in each phase, a medical image having a distance L between an object position and the one viewpoint position which is an equivalent distance L for the case of standard medical images. As described, by identifying a medical image from a plurality of medical images, a medical image is identified in which the size of the observation object displayed in the medical image becomes the same size as the observation object displayed in the standard medical image for each phase.

With regard to the standard medical image and each medical image for each phase, by linking information indicating the phase corresponding to the medical image data of the generation source, the viewpoint position-identifying part 31 causes the image storage 40 to store this information. The image storage 40 is storage for storing medical images. As described, with regard to medical image data in a plurality of phases corresponding to a predetermined examination, a series of medical images are generated and stored in the image storage 40.

The display controller 50 reads the series of medical images corresponding to a predetermined examination from the image storage 40. The display controller 50 refers to information indicating the phase incidental to each read medical image and generates a motion image by arranging a series of medical images according to the order of the phases. The display controller 50 causes the display of the U/I60 to display the generated motion images.

Figure 5A:
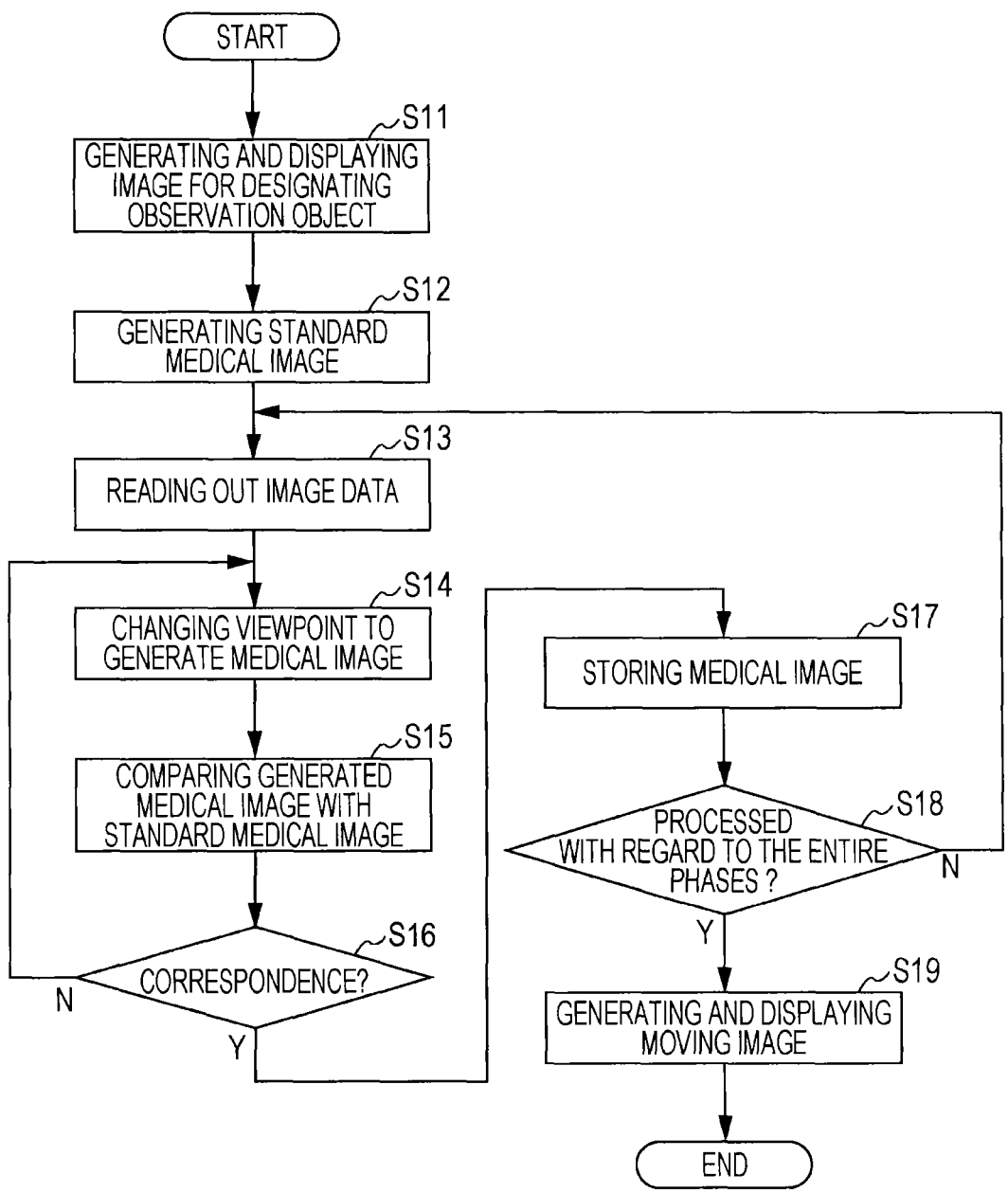
FIG. 5A is a flow chart showing a series of operations of the medical image processing apparatus pertaining to Embodiment 1.

Next, the series of operations of the medical image processing apparatus pertaining to the present embodiment are described with reference to FIG. 5A. FIG. 5A is a flow chart showing the series of operations of the medical image processing apparatus pertaining to the present embodiment.
(Step S11)

First, the structure extracting part 20 reads medical image data corresponding to a predetermined phase (for example, the earliest phase) from among medical image data of a plurality of phases corresponding to a predetermined examination. The structure extracting part 20 outputs the read medical image data to the tubular structure-extracting part 21.

The tubular structure-extracting part 21 receives the medical image data, analyses the voxel data in the medical image data, and extracts a tubular structure (that is, information indicating the structure such as the position of the tubular structure, the size, and the orientation) of a preliminarily determined tissue such as the esophagus, blood vessels, etc. The tubular structure-extracting part 21 outputs the information indicating the extracted tubular structure to the core line-extracting part 22.

The core line-extracting part 22 receives the information indicating the tubular structure from the tubular structure-extracting part 21. Based on this information, the core line-extracting part 22 extracts a core line in the axial direction in the lumen region of the tubular structure. Once the tubular structure and the core line are extracted, the structure extracting part 20 outputs the information indicating the tubular structure and the core line as well as medical image data corresponding to this information to the image generator 30.

The image generator 30 receives medical image data corresponding to the predetermined phase to which the information indicating the tubular structure and the core line is linked from the structure extracting part 20. The image generator 30 causes the temporary storage (not illustrated) to display this medical image data. Thereby, it becomes possible for the viewpoint position-identifying part 31 and the image processor 32 included in the image generator 30 to read the medical image data and each piece of information linked to the medical image data at a desired timing. Next, the image generator 30 causes the image processor 32 to generate a medical image based on the received medical image data.

The image processor 32 receives instructions from the image generator 30 and reads medical image data corresponding to a predetermined phase and information indicating a tubular structure and a core line corresponding to the data from the temporary storage. Based on the information, while changing the position of a camera (that is, the viewpoint position) along the core line, the image processor 32 generates a medical image representing the inside of the lumen in a tubular structure from each viewpoint position on the core line by subjecting the medical image data that has been read together with image processing. Thereby, by moving the viewpoint position along the core line, a fly-through image is generated presenting the inside of the lumen corresponding to the viewpoint position.

The image processor 32 outputs the generated fly-through image to the display controller 50. The display controller 50 causes the display of the U/I60 to display the fly-through image received from the image processor 32. The U/I60 is a user interface having roles as a display and an operation part. Thereby, it becomes possible to designate the position of an observation object inside the tubular structure via the operation part while using the fly-through image displayed on the display as a reference.
(Step S12)

The U/I60 outputs viewpoint information (that is, positional information) indicating the position (specifically, the position or region inside the tubular structure) of an observation object designated via the operation part to the viewpoint position-identifying part 31. The viewpoint position-identifying part 31 identifies the coordinates indicated by the information as the object position.

The viewpoint position-identifying part 31 identifies one viewpoint position for generating a fly-through image when viewing the observation object, based on the positional information of the object position. Herein, FIG. 4A is used as a reference. The viewpoint position-identifying part 31 identifies the core line R1 based on information indicating a core line linked to medical image data corresponding to the designated object position viewpoint.

Next, the viewpoint position-identifying part 31 identifies the viewpoint of a position P11 separated from the object position P12 by a predetermined distance L in a predetermined direction (−z direction) along the core line R1 as the one viewpoint position. When the one viewpoint position P11 is identified, the viewpoint position-identifying part 31 generates a medical image (that is, a standard medical image) when viewing the object position P12 from the identified one viewpoint position P11 and causes the temporary storage to store the medical image. Furthermore, V11 in FIG. 4A indicates the viewpoint V11 when viewing the object position P12 from the one viewpoint position P11 and the standard medical image is generated based on the viewpoint V11.
(Step S13)

When the standard medical image is generated, the image generator 30 instructs the structure extracting part 20 to identify a tubular structure and a core line in the same examination as in the examination in which medical image data corresponding to the standard medical image has been obtained but with regard to medical image data obtained in other phases different from the aforementioned data. Once these instructions are received, the structure extracting part 20 reads medical image data corresponding to the other phases from the image data storage 10, and causes the tubular structure-extracting part 21 and the core line-extracting part 22 to extract the tubular structure and the core line in the medical image data. Once the tubular structure and the core line are extracted, the structure extracting part 20 outputs information indicating the tubular structure to the image generator 30 by linking the information to the medical image data corresponding to the information. In this way, with regard to the medical image data corresponding to all phases in the examination, the structure extracting part 20 extracts the tubular structure and the core line, and outputs the information to the image generator 30 by linking the information to the corresponding medical image data.
(Step S14)

The image generator 30 receives medical image data corresponding to the other phases and information indicating the tubular structure and the core line corresponding to the data from the structure extracting part 20. The image generator 30 outputs the information and the medical image data to the image processor 32.

When the information indicating the tubular structure and the core line as well as the medical image data are received, the image processor 32 consecutively generates medical images when viewing the inside of the tubular structure from the viewpoint while changing the position of the viewpoint along the core line and outputs the medical images to the viewpoint position-identifying part 31.

(Step S15)

The viewpoint position-identifying part 31 receives a medical image corresponding to each viewpoint on the core line from the image processor 32. The viewpoint position-identifying part 31 compares the received medical images to a standard medical image temporarily stored in the storage. Then, the viewpoint position-identifying part 31 detects form characteristics with regard to each of the medical images, making it possible to confirm if there is any matching of the form characteristics between the two medical images.

(Step S16)

If the generated medical image does not match the standard medical image (Step S17, N), a medical image is generated again by changing the position of the viewpoint, and the medical image and the standard medical image are compared.

(Step S17)

If the generated medical image matches the standard medical image (Step S17, Y), the medical image is linked to information indicating the phase corresponding to the medical image data of the generation source and stored in the image storage 40. As described, by identifying a medical image, from a plurality of medical images, a medical image in which the size of the observation object displayed on the medical image is the same size as the observation object displayed in the standard medical image (that is, the distance L between an object position and the one viewpoint position becomes equal to the case of a standard medical image) is identified for each phase and stored in the medical image storage 40.

(Step S18)

If a medical image matching the standard medical image is not identified with regard to the entire phases (Step S18, N), the image generator 30 instructs the structure extracting part 20 to identify a tubular structure and a core line with regard to medical image data of the following phase. As described, the viewpoint position-identifying part 31 identifies a medical image that matches the standard medical image with regard to each phase among medical images corresponding to each of the viewpoints transmitted from the image processor 32.

(Step S19)

Once the medical images matching the standard medical image are stored in the image storage 40 with regard to all phases (Step S18, Y), the display controller 50 reads a series of the medical images (that is, a series of medical images corresponding to a predetermined examination) from the image storage 40. The display controller 50 uses information indicating a phase incidental to each of the read medical images and generates a motion image by arranging these series of medical images in the order of the phases. The display controller 50 causes the display of the U/I60 to display the generated motion image.

In the above, a one viewpoint position P11 (specifically, a medical image from the one viewpoint position P11) separated from the object position P12 by a predetermined distance L was identified based on a fly-through image with regard to other phases; however, the method is not limited as long as the object position P12 or the one viewpoint position P11 may be identified. For example, the identification may also be made based on sagittal images such as those shown in FIG. 2A or FIG. 3A or images from another direction, or the identification may also be made by detecting and comparing form characteristics from information indicating a tubular structure corresponding to each phase.

It should be noted that an example in which the vocal cords in the bronchial tube was an observation object was described in the above but the application is also possible with the heart, blood vessels such as the aorta, and the intestines (large intestine or small intestine). This is the same with regard to other embodiments and modified examples described hereinafter. Hereafter, a specific example is described in the application to the heart, blood vessels, and intestines.

Figure 9A:
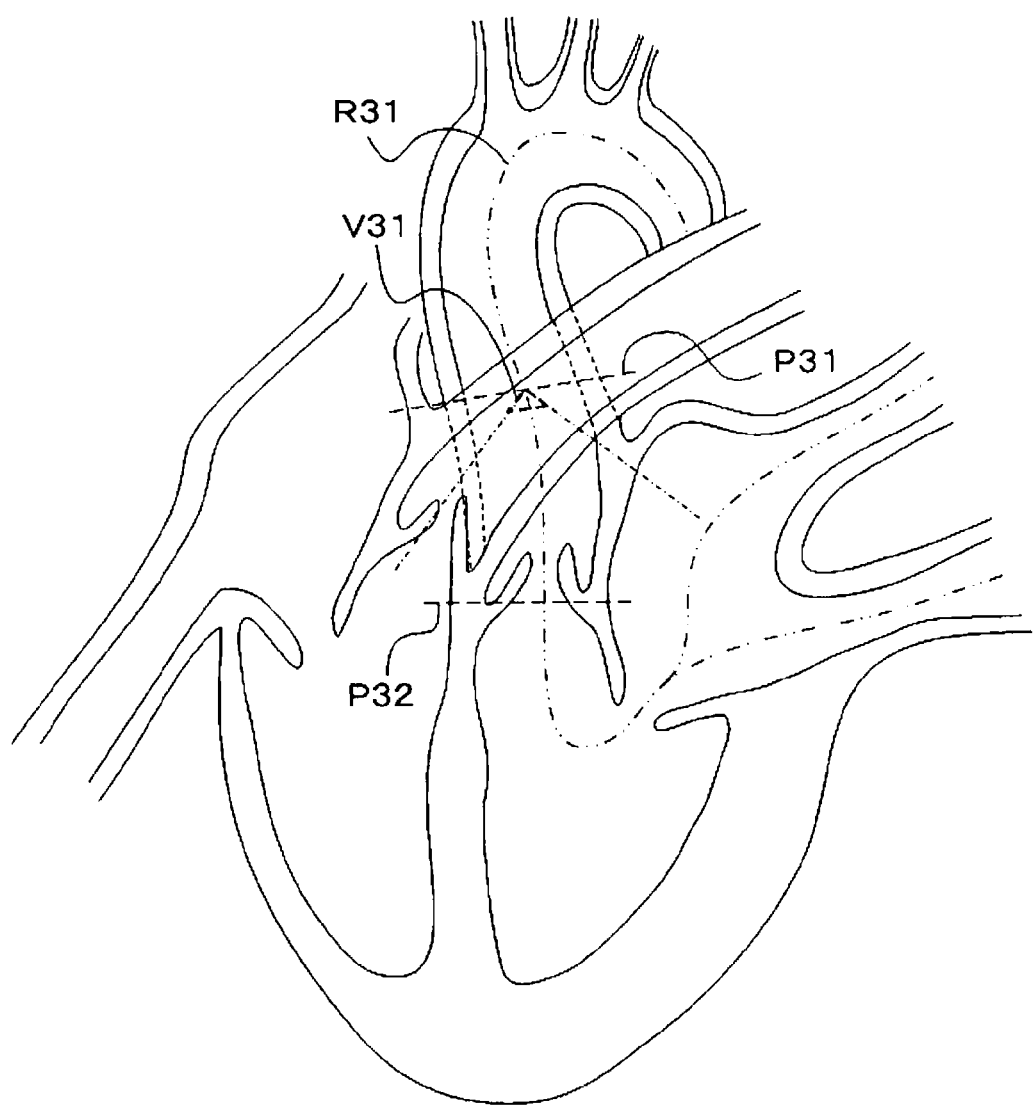
FIG. 9A shows the outline of a heart and an aorta.
Figure 9B:
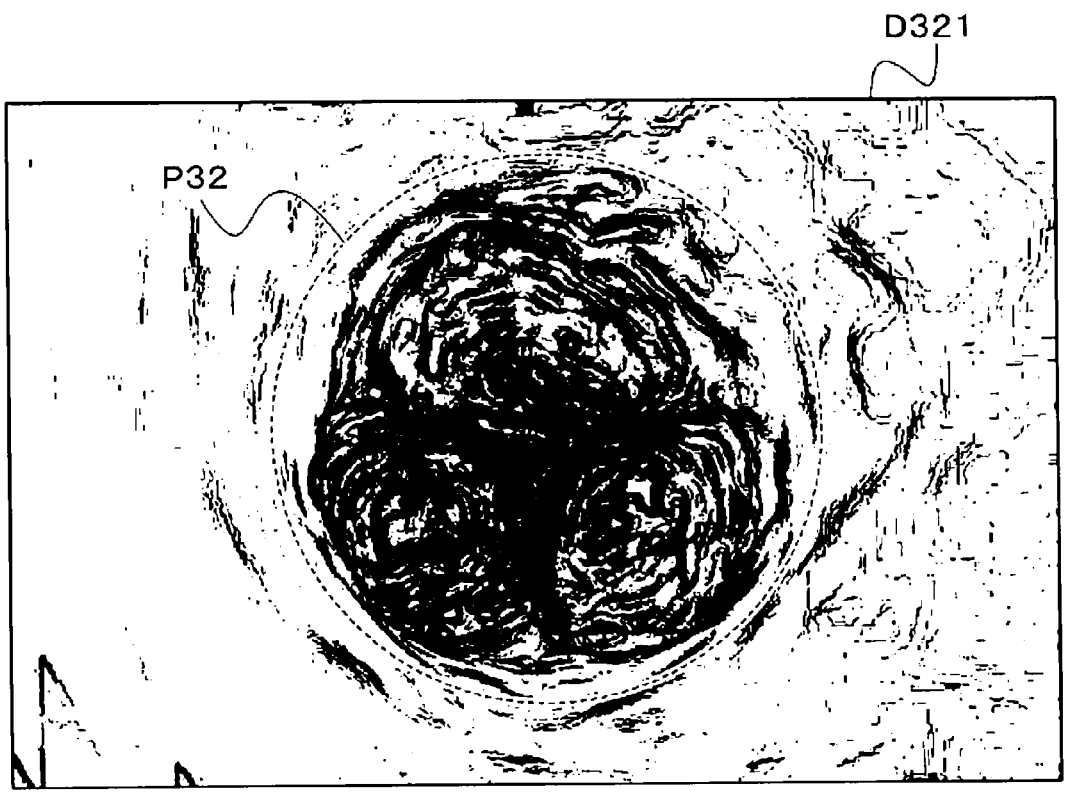
FIG. 9B is one example of a fly-through image displaying a valve of the heart.

When applied to the heart, for example, a case exists in which a valve of the heart is the observation object. For example, FIG. 9A and FIG. 9B indicate a case in which a valve of the heart is an observation object. FIG. 9A is a drawing showing the outline of the heart and the aorta. In the example shown in FIG. 9A, a tubular structure comprising the left atrium, left ventricle, and the aorta has been extracted wherein R31 indicates the core line of the tubular structure. The position P32 in FIG. 9A indicates the position of the valve between the left ventricle and the aorta, while the position P32 is identified as an observation position. Furthermore, in FIG. 9A, a position separated from the object position P32 by the distance L onto the aorta side along the core line R31 is identified as the one viewpoint position P31, while the viewpoint V31 is set so as to view the object position P32 from the position. FIG. 9B is one example of a medical image D321 (fly-through image) when viewing the object position P32 from the viewpoint V31. P32 in FIG. 9B corresponds to the object position P32 in FIG. 9A.

Figure 10A:
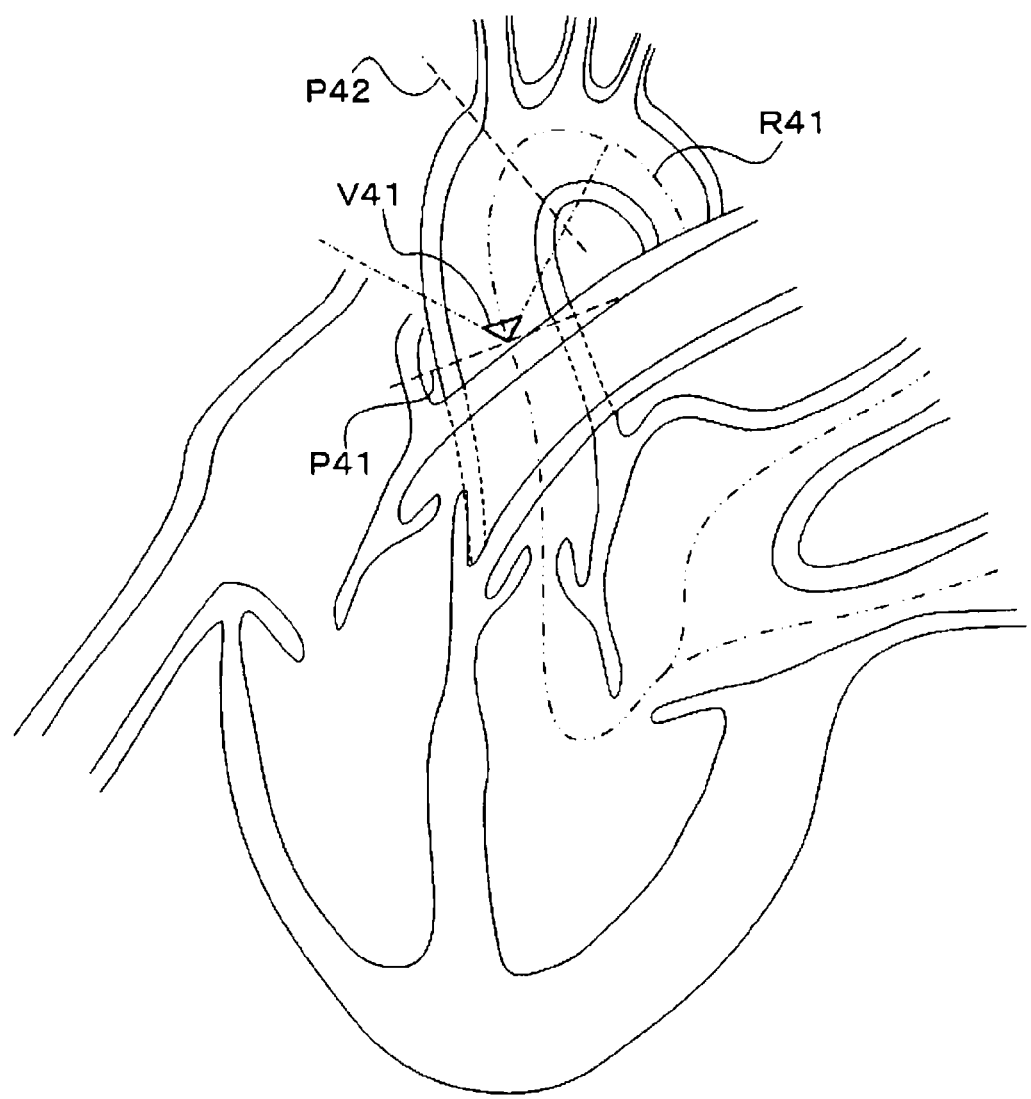
FIG. 10A shows the outline of a heart and an aorta.
Figure 10B:
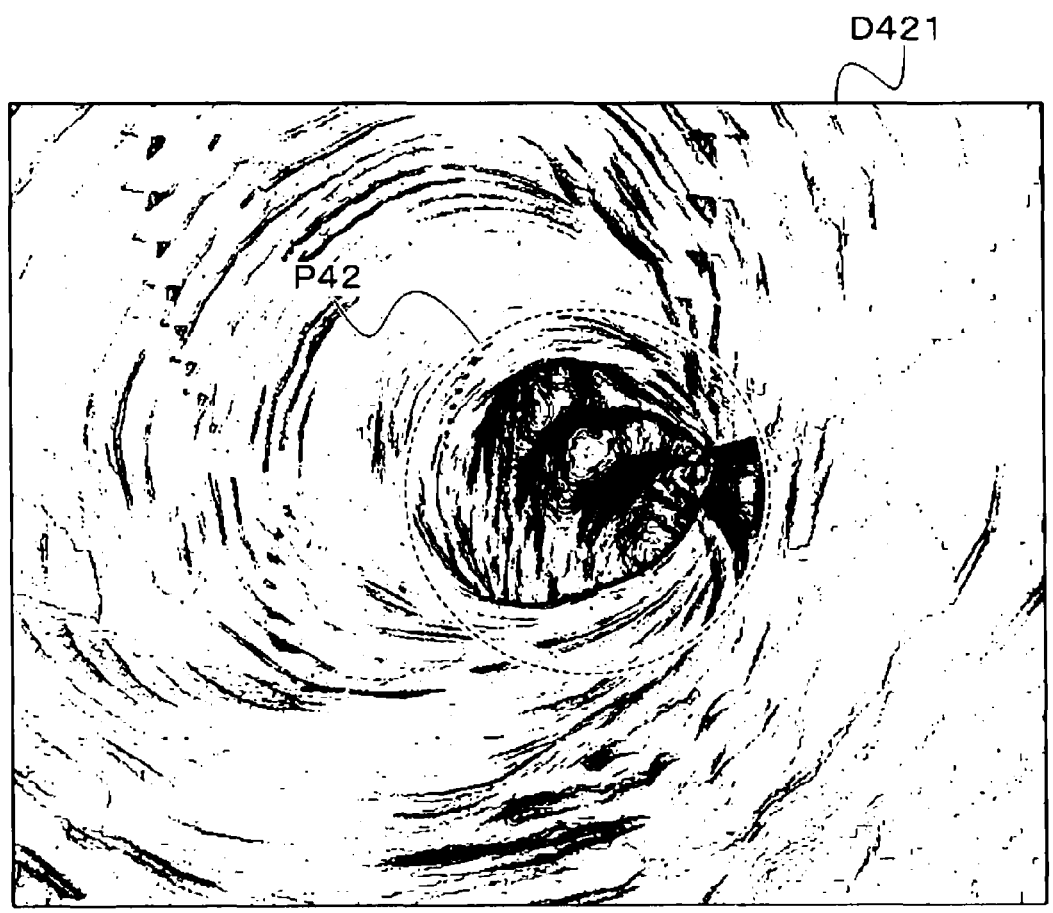
FIG. 10B is one example of a fly-through image displaying the inside of the aorta.

Furthermore, when applied to the blood vessels, for example, cases in which a tumor in the blood vessels, stricture, and joints in the blood vessels may be cited as observation objects. For example, FIG. 10A and FIG. 10B show cases of the application to an aorta, in which a portion of the joint of the aorta is an observation object. FIG. 10A is a drawing showing an outline of a heart and an aorta. In the example shown in FIG. 10A, a tubular structure comprising the left atrium, left ventricle, and aorta has been extracted while R41 indicates a core line of the tubular structure. The position P42 in FIG. 10A shows the position of a joint at which the aorta splits while the position P42 is identified as the object position. Moreover, in FIG. 10A, the position separated from the object position P42 by the distance L onto the upstream side along the core line R41 is identified as the one viewpoint position P41 and, from this position, a viewpoint V41 is set so as to view the object position P42. FIG. 10B is one example of a medical image D421 (fly-through image) when viewing the object position P42 from the viewpoint V41. P42 in FIG. 10B corresponds to the object position P42 in FIG. 10A.

Figure 11A:
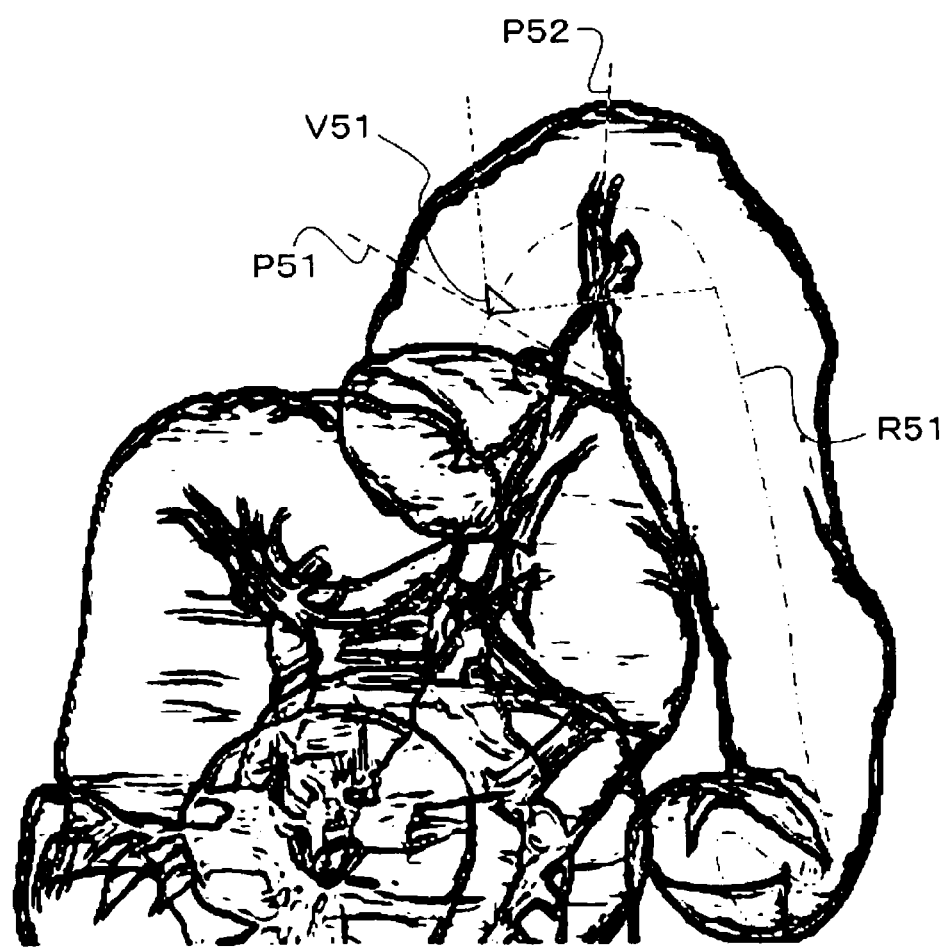
FIG. 11A is a drawing indicating the outline of a large intestine.
Figure 11B:
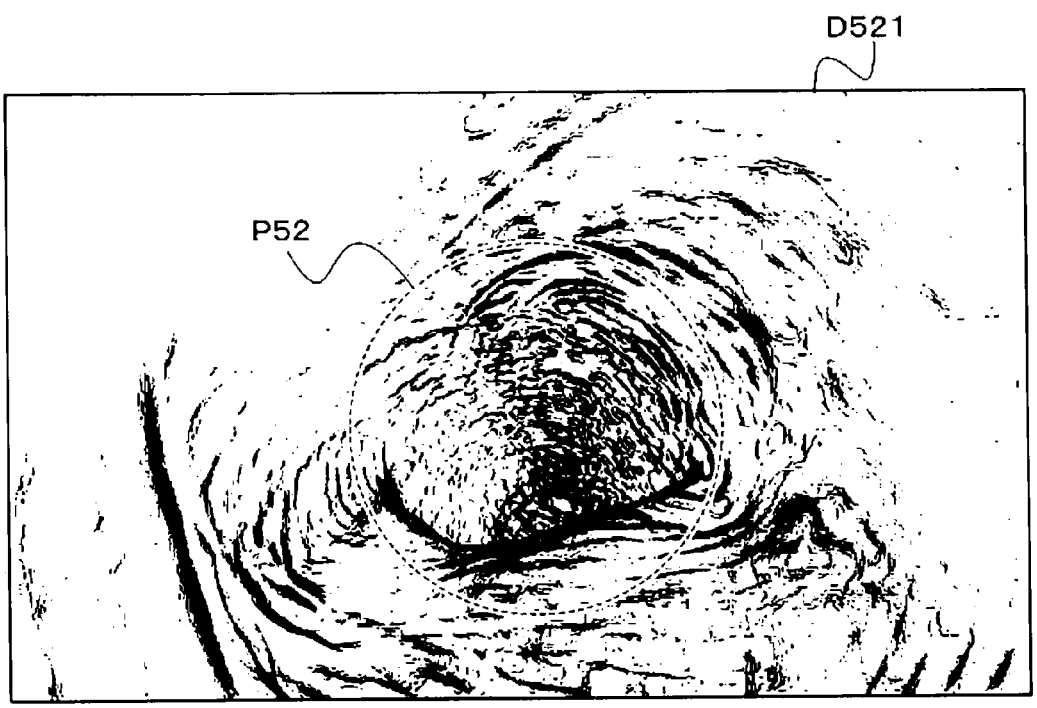
FIG. 11B is one example of a fly-through image displaying the inside of the large intestine.

In the case of an application to the intestine, for example, exemplary cases in which folds formed on the inner wall of the intestine or a tumor developed within the intestine may be cited as observation objects. For example, FIG. 11A and FIG. 11B show an applied case to a large intestine, and a part within the large intestine (for example, the portion where the tumor has developed) is an observation object. FIG. 11A is a drawing showing the outline of the large intestine. In the example shown in FIG. 11A, the large intestine is extracted as a tubular structure, while R51 indicates the core line of the tubular structure. The position P52 in FIG. 11A indicates the part within the large intestine (for example, the portion where a tumor has developed), while the position P52 is identified as an object position. Furthermore, in FIG. 11A, a position separated from the object position P52 by the distance L on the upstream side along the core line R51 is identified as one viewpoint position P51, and the viewpoint V51 is set so as to view the object position P52 from the position. FIG. 11B is one example of a medical image D521 (fly-through image) when viewing the object position P52 from the viewpoint V51. P52 in FIG. 11B corresponds to the object position P52 in FIG. 11A.

As described, in the medical image processing apparatus pertaining to the present embodiment, a medical image matching a standard medical image is identified with regard to each phase. In other words, the medical image processing apparatus identifies the one viewpoint position regarding medical image data corresponding to each phase such that the distance L between the object position P12 (or P13) and one viewpoint P11 becomes equal among each of the phases and generates a medical image (that is, a fly-through image). Thereafter, the medical image processing apparatus generates and displays a motion image by arranging a series of generated medical images in the order of the phases. Thereby, in each phase, because the distance between the one viewpoint position and an object position is evenly maintained, even if the position of the observation object changes due to body movements, the observation object is displayed in a predetermined size in the medical image, making it possible to display the observation object in the motion image while maintaining the observation object in a predetermined size.

Modified Example 1

In Embodiment 1, an object position is designated only with regard to a predetermined phase; however, the object position may also be designated with regard to all phases. In Modified Example 1, operations in this case are described focusing on areas that are different from Embodiment 1.

The structure extracting part 20 consecutively reads each piece of medical image data of a plurality of phases corresponding to a predetermined examination, and instructs the tubular structure-extracting part 21 as well as the core line extracting part 22 to identify a tubular structure and a core line with respect to the read medical image data. The extracting method of the tubular structure and the core line with respect to the each medical image data is the same as Embodiment 1. Once the tubular structure and the core line are extracted, the structure extracting part 20 links information indicating the tubular structure as well as the core line to medical image data corresponding to the information and outputs the information to the image generator 30. As described, with regard to the series of medical image data corresponding to the predetermined examination, the structure extracting part 20 extracts the tubular structure and the core line, links the information, and outputs the information to the image generator 30.

The image generator 30 receives from the structure extracting part 20 a series of medical image data corresponding to the predetermined examination and the information indicating the tubular structure as well as the core line corresponding to the data. The image generator 30 links the information and the medical image data received at the same time and causes the temporary storage (not illustrated) to store the information and the data. Next, the image generator 30 causes the image processor 32 to generate medical images based on the received medical image data.

The image processor 32 receives instructions from the image generator 30 and consecutively reads from the temporary storage, medical image data corresponding to each phase and information indicating the tubular structure as well as the core line corresponding to the data. Based on the information, the image processor 32 subjects the medical image data that has been simultaneously read to image processing while changing the position (that is, the viewpoint position) of the camera along the core line to generate medical images (that is, fly-through images) representing the tubular structure and the inside of the lumen from each viewpoint position on the core line with regard to the each phase.

The image processor 32 respectively outputs the generated fly-through images corresponding to each phase to the display controller 50. The display controller 50 causes the display of the U/I 60 to display the fly-through images corresponding to each phase that has been received from the image processor 32 in chronological order. Whereby, it becomes possible for the operator to designate, via the operation part, the position of an observation object inside the tubular structure for each timing point while sequentially using the fly-through images corresponding to each timing point as a reference.

The U/I 60 outputs information (that is, positional information) indicating the position (specifically, the position or the region inside the tubular structure) of the observation object designated for each timing point to the viewpoint position-identifying part 31 via the operation part. The viewpoint position-identifying part 31 identifies the coordinates indicated by the positional information designated for each timing point as an object position corresponding to the timing point.

Based on the positional information regarding the object position corresponding to each timing point, the viewpoint position-identifying part 31 identifies the viewpoint position (that is, the one viewpoint position) for generating a fly-through image when viewing an observation object for each timing point. Specifically, first, the viewpoint position-identifying part 31 reads medical image data corresponding to the timing point of a processing object from the temporary storage. Next, as shown in FIG. 4A, the viewpoint position-identifying part 31 identifies the core line R1 in the medical image data based on the information indicating the core line that has been linked to the medical image data viewpoint Next, the viewpoint position-identifying part 31 identifies, as one viewpoint position, the position P11 separated from the object position P12 by a preliminarily determined distance L in a predetermined direction (−z direction) along the core line R1.

Once the one viewpoint position P11 is identified, the viewpoint position-identifying part 31 outputs information indicating the viewpoint V11 when viewing the object position P12 from the identified one viewpoint position P11 and corresponding medical image data to the image processor 32. The image processor 32 generates a medical image (that is, a fly-through image) based on the information indicating the viewpoint V11 as well as the medical image data and causes the image storage 40 to store the information and the data. As described, with regard to all timing points, the viewpoint position-identifying part 31 identifies one viewpoint P11, generates a medical image when viewing the object position P12 from the identified one viewpoint position P11, links the medical image to information indicating the timing point corresponding to the medical image data of the generation source, and causes the image storage 40 to store the medical images and the information. As described, with regard to medical image data at a plurality of timing points corresponding to a predetermined examination, a series of medical images are generated and stored in the image storage 40.

The display controller 50 reads a series of medical images corresponding to the prescribed examination from the image storage 40. Using the information indicating the timing point incidental to each of the read medical images as a reference, the display controller 50 generates a motion image by arranging a series of medical images in chronological order. The display controller 50 causes the display of the U/I60 to display the generated motion image.

As described thus far, in the medical image processing apparatus pertaining to Modified Example 1, the object position P12 is designated by the operator with regard to medical image data corresponding to each timing point and, with regard to each timing point, one viewpoint position P11 separated from the object position P12 by a predetermined distance L along the core line R1 is identified. With such a configuration, the distance between the object position P12 (or P13) and the one viewpoint position P11 becomes even among each timing point. Thereafter, the medical image processing apparatus generates and displays a motion image by arranging a series of generated medical images in chronological order. Therefore, as in the medical image processing apparatus in Embodiment 1, even when the position of an observation object changes due to body movements, it becomes possible to display the observation object as a motion image while maintaining the observation object in a predetermined size.

Embodiment 2

Figure 5B:
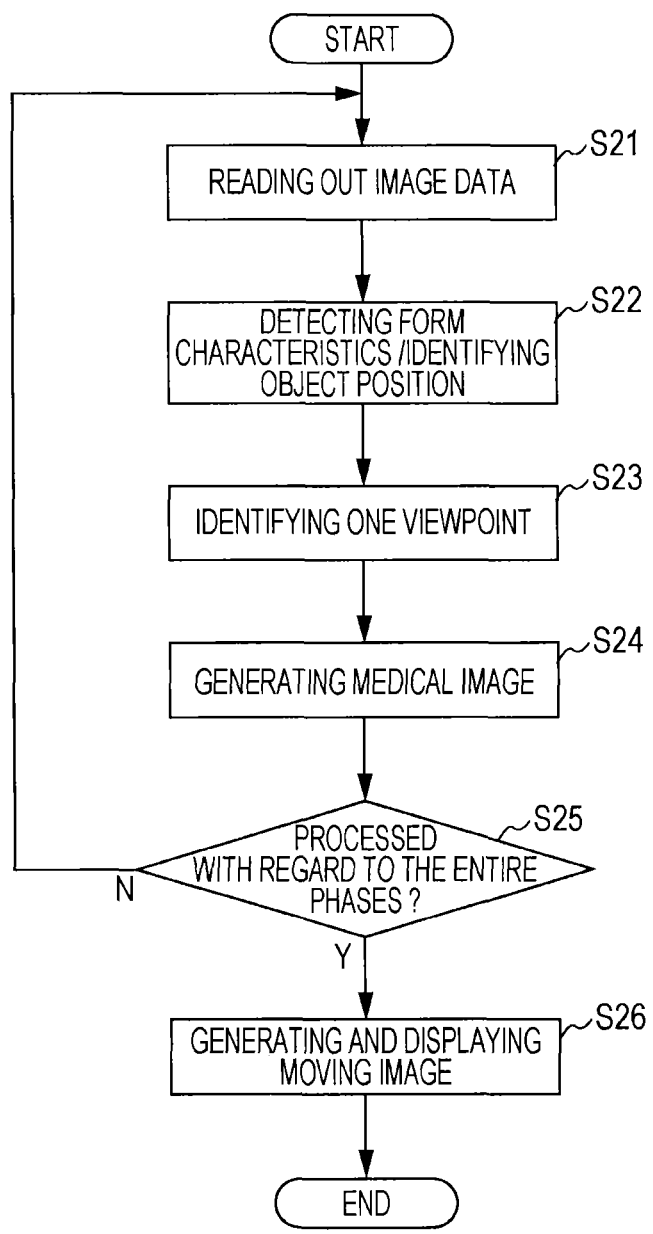
FIG. 5B is a flow chart showing a series of operations of the medical image processing apparatus pertaining to Embodiment 2.

Next, a medical image processing apparatus pertaining to Embodiment 2 is described. In the medical image processing apparatus pertaining to Embodiment 1 and Modified Example 1, the object position P12 was designated by the operator; however, in the present embodiment, the position of tissues having form characteristics such as vocal cords, etc. is automatically detected as object position P12 by the medical image processing apparatus itself. Hereinafter, operations of the medical image processing apparatus pertaining to the present embodiment are described with reference to FIG. 5B, focusing on areas that are different from Embodiment 1. FIG. 5B is a flow chart showing the series of operations of the medical image processing apparatus pertaining to Embodiment 2.
(Step S21)

The structure extracting part 20 reads medical image data corresponding to a predetermined timing from medical image data of a plurality of timing points corresponding to a predetermined examination. The structure extracting part 20 instructs the tubular structure-extracting part 21 and the core line-extracting part 22 to identify a tubular structure and a core line with respect to the read medical image data. The method of extracting the tubular structure and the core line with respect to each medical image data is the same as Embodiment 1. Once the tubular structure and the core line are extracted, the structure extracting part 20 outputs information indicating the tubular structure and the core line as well as medical image data corresponding to the information to the image generator 30.

The image generator 30 receives medical image data to which the information indicating the tubular structure and the core line is linked from the structure extracting part 20. The image generator 30 outputs the information and the medical image data to the viewpoint position-identifying part 31.
(Step S22)

The viewpoint position-identifying part 31 receives the information indicating the tubular structure and the core line as well as the medical image data, analyzes the information, and detects the form characteristics of an observation object (for example, vocal cords) preliminarily designated in the tubular structure. It should be noted that the observation object (for example, the site of the vocal cords, small intestine, large intestine, etc.) may be designated by the operator via the U/I60, or preliminarily determined information may also be stored in the apparatus. The viewpoint position-identifying part 31 identifies the position of the detected form characteristics as the object position P12.
(Step S23)

Next, based on the positional information of the object position P12, the viewpoint position-identifying part 31 identifies the viewpoint position (that is, the one viewpoint position P11) for generating a fly-through image when viewing the observation object. Specifically, first, based on information indicating a core line linked to medical image data, as shown in FIG. 4A, the viewpoint position-identifying part 31 identifies the core line R1 in the medical image data. Next, the viewpoint position-identifying part 31 identifies, as the one viewpoint position, a position P11 separated from the object position P12, by a preliminarily determined distance L in a predetermined direction (−z direction) along the core line R1.
(Step S24)

Once the one viewpoint position P11 is identified, the viewpoint position-identifying part 31 outputs information indicating the viewpoint V11 when viewing the object position P12 from the identified one viewpoint position P11 and corresponding medical image data to the image processor 32. The image processor 32 generates a medical image (that is, a fly-through image) based on the information indicating the viewpoint V11 and medical image data, links the medical image to information indicating the timing corresponding to the medical image data of the generation source, and causes the image storage 40 to store the medical image and the information.
(Step S25)

With regard to all timing points, if the one viewpoint position P11 has been identified but a corresponding medical image has not been generated yet (Step S25, N), the image generator instructs the structure extracting part 20 to identify a tubular structure and a core line regarding the medical image data of the following timing point. As described, with regard to the medical image data of a plurality of timing points corresponding to a predetermined examination, a series of medical images are generated and stored in the image storage 40.
(Step S26)

With regard to all timing points, once the one viewpoint position P11 has been identified and a series of medical images corresponding to a predetermined examination has not been stored (Step S25, Y), the display controller 50 reads a series of medical images from the image storage 40. Using information indicating the timing incidental to each of the read medical images as a reference, the display controller 50 generates a motion image by arranging a series of medical images in chronological order. The display controller 50 causes the display of the U/I60 to display the generated motion image.

It should be noted that in the above, the object position P12 is identified based on information indicating a tubular structure; however, the method is not limited as long as the object position P12 is identifiable. For example, as in Embodiment 1, by generating a fly-through image, based on this, the form characteristics may be detected. Moreover, the form characteristics may also be detected based on the sagittal images shown in FIG. 2A or in FIG. 3A or images from other directions.

As described thus far, with regard to each timing point, the medical image processing apparatus pertaining to the present embodiment analyzes information based on medical image data (for example, information indicating a tubular structure), detects the form characteristics, and identifies the object position P12. Thereafter, the medical image processing apparatus generates a medical image by identifying the one viewpoint position P11 such that the distance between the object position P12 (or P13) and the one viewpoint position P11 becomes even among each timing point. Thereby, even when the position of an observation object changes due to body movements, the medical image processing apparatus itself automatically detects the position of the observation object, making it possible to display the observation object in a predetermined size in the medical image.

Modified Example 2

Figure 6:
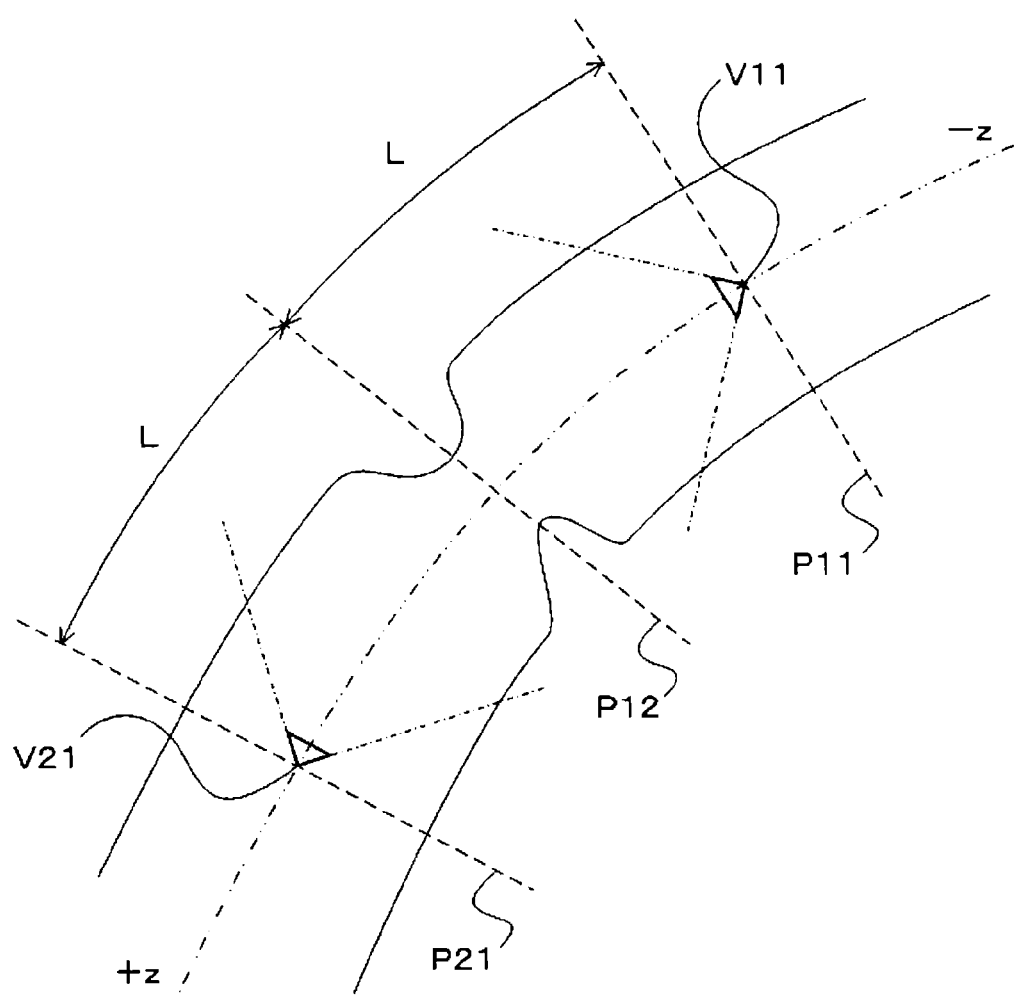
FIG. 6 is a drawing explaining a method of identifying one viewpoint position in the medical image processing apparatus pertaining to Modified Example 2.

Next, a medical image processing apparatus pertaining to Modified Example 2 is described. In the previous embodiments and modified examples, an example of displaying a medical image from a viewpoint V11 that is separated from the object position P12 by a preliminarily determined distance L in the preliminarily predetermined direction (−z direction) along the core line R1 was described. In the medical image processing apparatus pertaining to Modified Example 2, in addition to the medical image from this viewpoint V11, a medical image from a viewpoint V21 located on the opposite side from the viewpoint V11 is displayed such that the sizes of an observation object among a plurality of timing points become the same. Hereinafter, the configuration of the medical image processing apparatus pertaining to Modified Example 2 is described with reference to FIG. 6, focusing on the operations of the viewpoint position-identifying part 31 different from the previously described embodiments and modified examples. FIG. 6 is a drawing for describing a method of identifying the one viewpoint position in the medical image processing apparatus pertaining to Modified Example 2.

The viewpoint position-identifying part 31 first identifies the object position P12 and the one viewpoint position P11. The method of identifying these is the same as in the previously described embodiments and modified examples. It should be noted that in case of medical image data corresponding to another timing in Embodiment 1, the one viewpoint position P11 of a medical image matched with a standard medical image is identified and a position separated from the one viewpoint position P11 by the distance L in the direction to which a viewpoint is facing along the core line R1 just has to be identified as the object position P12.

Figure 7A:
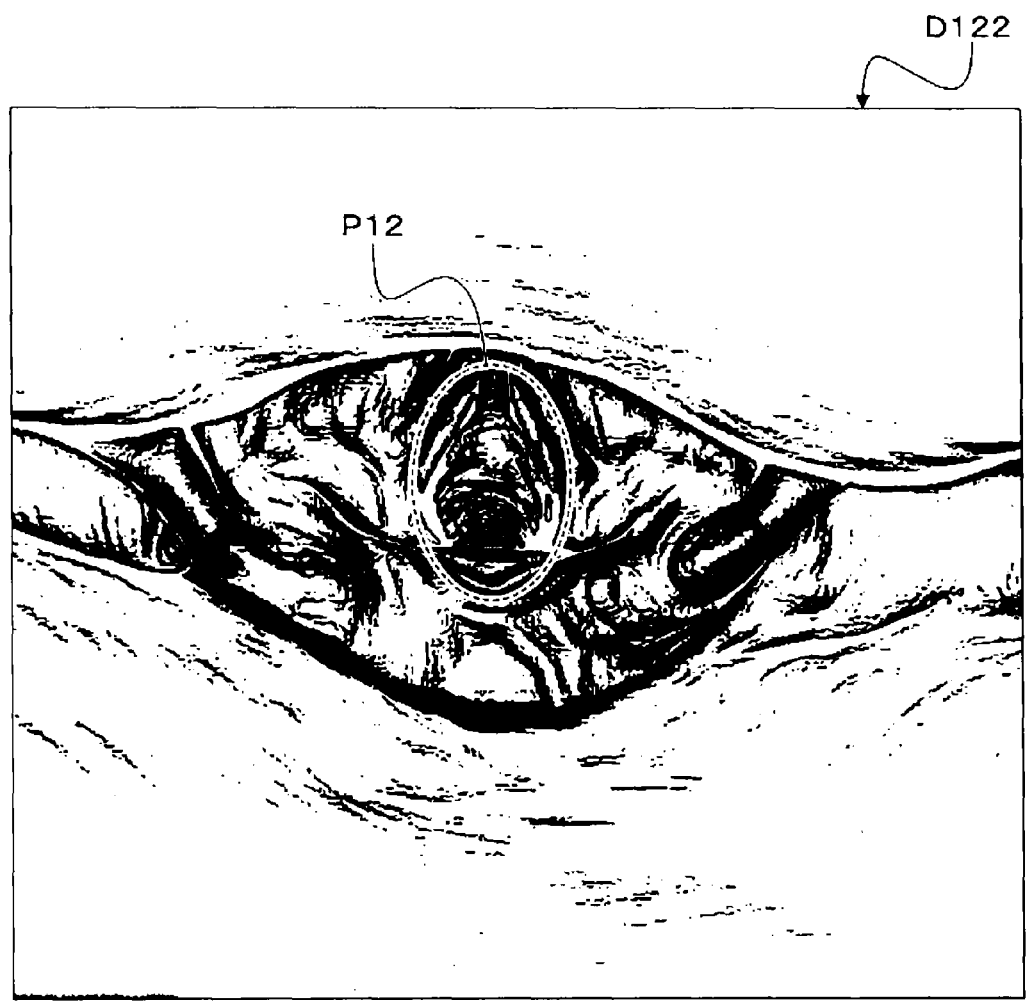
FIG. 7A is one example of medical images generated in the medical image processing apparatus pertaining to Modified Example 2.
Figure 7B:
FIG. 7B is one example of medical images generated in the medical image processing apparatus pertaining to Modified Example 2.

Once the object position P12 and the one viewpoint position P11 are identified, based on the object position P12, the viewpoint position-identifying part 31 identifies, as another viewpoint position P21, a position P21 separated by the distance L in the direction (that is,) on the opposite side from the viewpoint position P11 along the core line R1. Once the one viewpoint position P11 and the one viewpoint position P21 are identified, the viewpoint position-identifying part 31 outputs information indicating the viewpoint V11 when viewing the object position P12 from the identified one viewpoint position P11, information indicating the viewpoint V21 when viewing the object position P12 from the one viewpoint position P21, and the corresponding medical image data to the image processor 32. Based on the information indicating the viewpoints V11 and V21 and the medical image data, the image processor 32 generates medical images with regard to both viewpoints V11 and V21 (that is, the fly-through images), respectively links the each image to the information indicating the timing points corresponding to the medical image data of the generation sources, and causes the image storage 40 to store the medical images and the information. FIG. 7A and FIG. 7B show one example of generated medical images. The medical image D122 shown in FIG. 7A is a fly-through image of a case in which the object position P12 is displayed from the viewpoint position P11, that is, showing a medical image based on the viewpoint V11. Furthermore, the medical image D123 shown in FIG. 7B is a fly-through image of a case in which the object position P12 is displayed from the viewpoint position P21, that is, showing a medical image based on the viewpoint V21. As described, with the object position P12 as a reference point, the distance to the one viewpoint position P11 and the distance to the one viewpoint position P21 become the same (that is, the distance L); consequently, as shown in FIG. 7A and FIG. 7B, the sizes of the observation object (that is, the vocal cords) become the same between the two images. As described, with regard to medical image data of a plurality of timing points corresponding to a predetermined examination, a series of medical images are generated and stored in the image storage 40.

When a series of medical images corresponding to a predetermined examination are stored in the image storage 40, the display controller 50 distinguishes and reads medical images based on the viewpoint V11 and medical images based on the viewpoint V21 from the image storage 40. The display controller 50 uses information indicating the timing incidental to each read medical image, arranges a series of medical images in chronological order, and generates motion images. Thereby, a motion image based on the viewpoint V11 and a motion image based on the viewpoint V21 are generated. The display controller 50 causes the display of the UI/60 to display the generated motion images. It should be noted that, subsequently, the display controller 50 may also cause the display to display each motion image by matching the timing point of the motion picture based on the viewpoint V11 and the timing of the motion picture based on the viewpoint V21.

It should be noted that in the above, an example of identifying the one viewpoint positions P11 and P21 separated by the distance L along the core line R1 based on the object position P12 was described; however, each one viewpoint position does not necessarily have to be along the core line R1 as long as the position is separated from the object position P12 by the distance L.

Figure 8A:
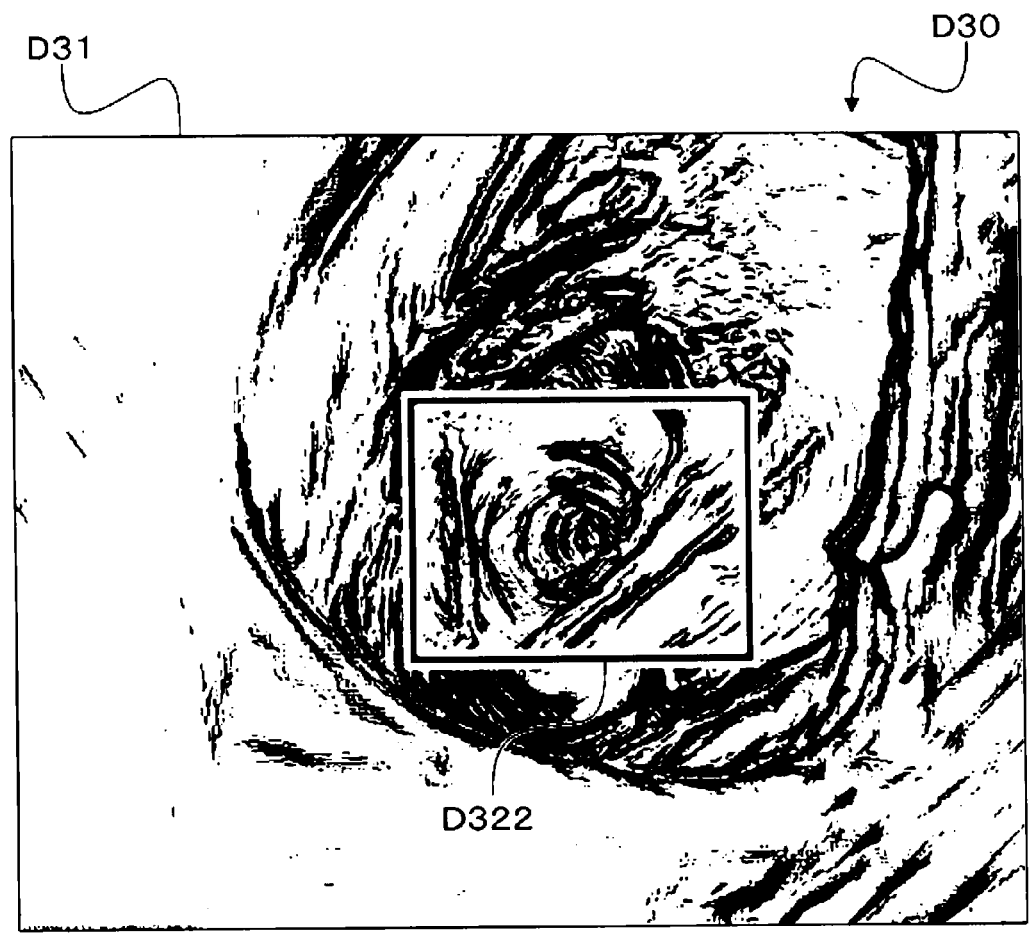
FIG. 8A is a drawing showing one example of display aspects in the medical image processing apparatus pertaining to Modified Example 2.

Furthermore, the display controller 50 may also display medical images by inverting left to right either the medical image (or motion image) based on the viewpoint V11 or the medical image (or motion image) based on the viewpoint V21. Such a display aspect is described specifically with reference to FIG. 8A through 8D. The image D30 shown in FIG. 8A is one example of such a display aspect, in which with respect to medical image data obtained by imaging the large intestine, the viewpoint V11 and the viewpoint V21 are identified as previously described and an example displaying a medical image from each viewpoint is shown. The medical image D31 in FIG. 9A corresponds to the viewpoint V11 while the medical image D322 is an inverted display of a medical image D321 corresponding to the viewpoint V21.

Figure 8B:
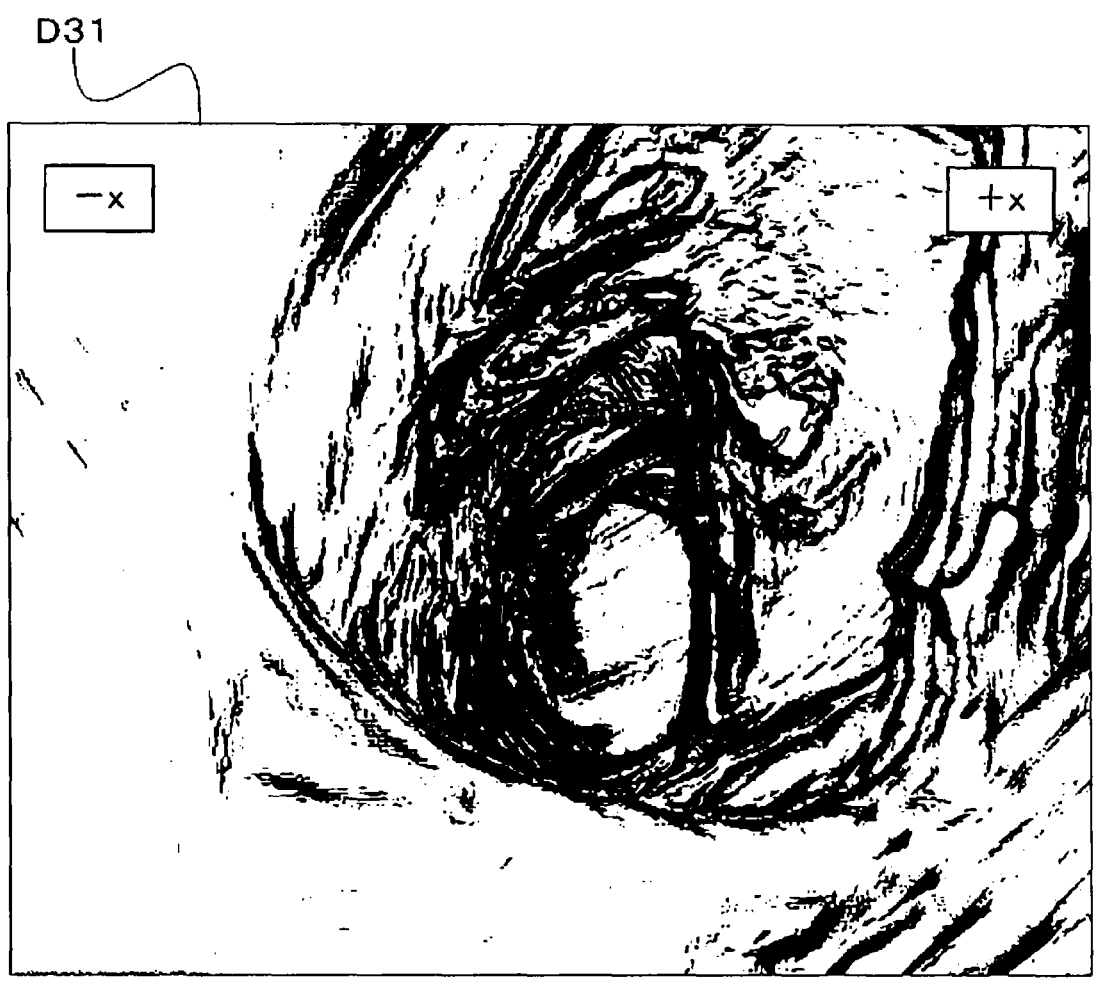
FIG. 8B is a drawing explaining one example of the display aspects in the medical image processing apparatus pertaining to Modified Example 2.
Figure 8C:
FIG. 8C is a drawing explaining one example of the display aspects in the medical image processing apparatus pertaining to Modified Example 2.

Herein, FIG. 8B and FIG. 8C are used as references. FIG. 8B shows a medical image D31 corresponding to the viewpoint V11. FIG. 8C shows a medical image D321 corresponding to the viewpoint V21. Herein, in both medical images, if the left direction is "−x direction" and the right is "+x direction", the internal wall displayed on the +x direction side of the medical image D31 is displayed on the −x direction side on the medical image D321 side. For this, when these medical images are displayed together, it is difficult to intuitively discover which of either the left or the right portion in each medical image corresponds to which part of the other medical image.

Figure 8D:
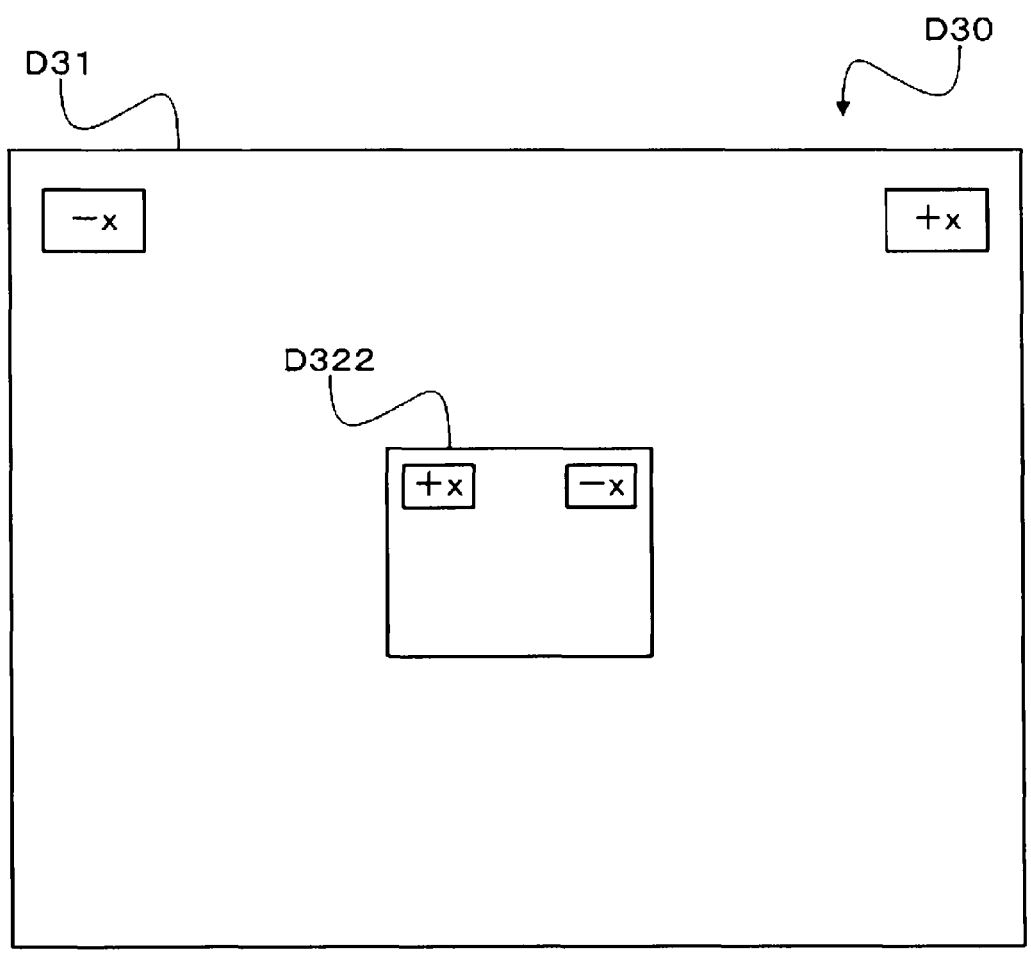
FIG. 8D is a drawing explaining one example of the display aspects in the medical image processing apparatus pertaining to Modified Example 2.

For this reason, in the display aspect shown in FIG. 8A, the medical image D322 which is a left to right inversion of the medical image D321 is displayed together with the medical image D31. Herein, FIG. 8D is used as a reference. FIG. 8D is a drawing explaining the display aspect shown in FIG. 8A. As described, by displaying the medical image D322 which was a left to right inversion together with the medical image D31 as shown in FIG. 8A, for example, a portion corresponding to the +x direction in the medical image D31 from the viewpoint V11 and the −x direction in medical images (that is, medical images D321 and 322) corresponding to the viewpoint V21 are displayed in the same direction (that is, the right side). Therefore, it becomes easier to intuitively discover which of either the left or the right portion in one of the medical images corresponds to which part of the other medical image.

As described thus far, the medical image processing apparatus pertaining to Modified Example 2 generates, at each timing point, medical images in which an observation object is displayed from a plurality of directions. Subsequently, the position of a viewpoint to generate each medical image (that is, the one viewpoint positions P11 and P21) is set at a location separated by an equal distance L, when the position of the observation object (that is, object position P12) is a reference point. As described, with regard to each timing point, the viewpoints V11 and V21 are identified to generate medical images based on each viewpoint. Thereby, it becomes possible to display medical images from a plurality of directions such that the sizes of the observation object become the same and, even in the case of position changes of the observation object due to body movements, it is possible to display the observation object in a motion image while maintaining the observation object in a predetermined size.

Modified Example 3

Figure 12A:
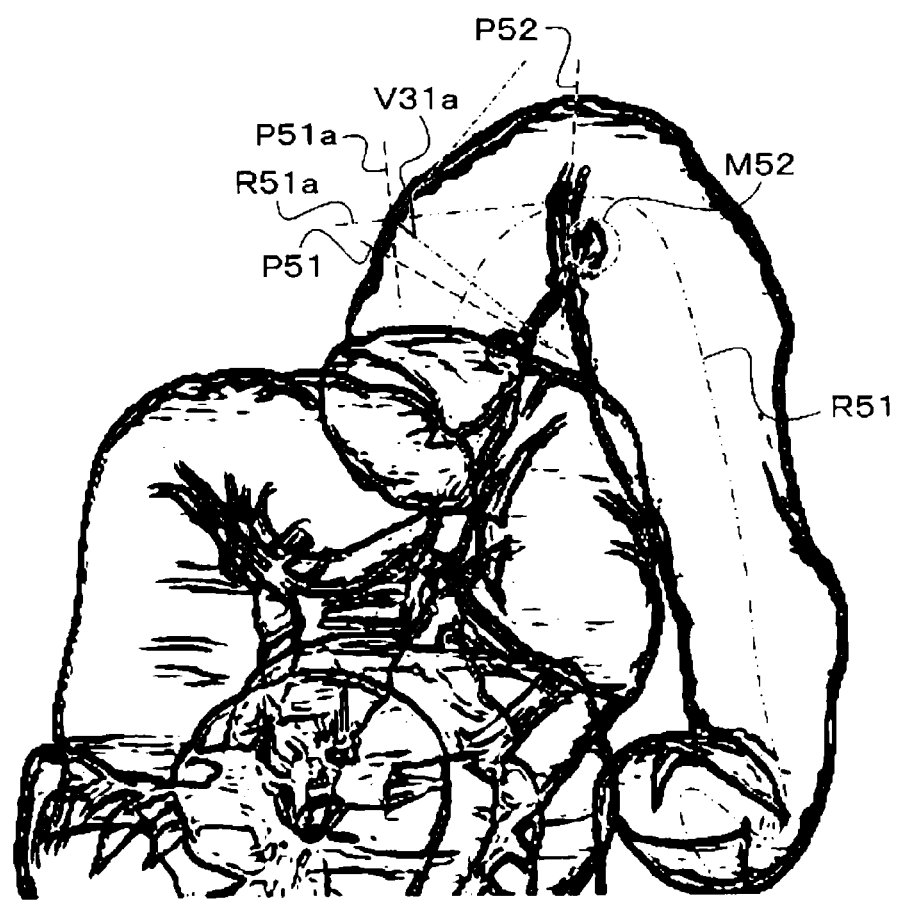
FIG. 12A is a drawing indicating the outline of the large intestine explaining a method of identifying one viewpoint position pertaining to Modified Example 3.

Next, a medical image processing apparatus pertaining to Modified Example 3 is described. In the previously described embodiments and the modified examples, an example of displaying a medical image from the viewpoint V11 separated from the object position P12 by a preliminarily determined distance L along the core line R1 was described. However, for areas in which a tubular structure has a rapid curve such as the large intestine or the aorta, after one viewpoint position is determined along the core line, because the wall surface of the tubular structure interposes between a viewpoint and an observation object, it is sometimes impossible to view the observation object from the viewpoint. Herein, FIG. 12A is used as a reference. FIG. 12A is a drawing describing a method of identifying the one viewpoint position pertaining to Modified Example 3 and shows an outline of a large intestine. The one viewpoint position P51 and the object position P52 in FIG. 12A respectively correspond to the one viewpoint position P51 and the object position P52 in FIG. 11A. When the viewpoint V11 is provided at the one viewpoint position P11 along the core line R1 to display a fly-through image when viewing the object position P52, the region indicated by M52 is blocked by the intestinal wall and cannot be observed from the viewpoint V11. Therefore, in the medical image processing apparatus pertaining to Modified Example 3, in such a case, for example, a position separated from the object position by the distance L in a predetermined direction is identified as the one viewpoint position without limiting the core line R1. Hereinafter, the method of identifying the one viewpoint position by the medical image processing apparatus pertaining to Modified Example 3 is described focusing on an areas that are different from other embodiments or modified examples by taking an example of a case with a large intestine as shown in FIG. 12A.

The structure extracting part 20 respectively reads the medical image data at a plurality of timing points corresponding to a predetermined examination. The structure-extracting part 20 instructs the tubular structure-extracting part 21 and the core line-extracting part 22 to identify a tubular structure and a core line with respect to the read medical image data. Thereby, a tubular structure and a core line R51 are identified with regard to each image data. The method of extracting the tubular structure and the core line with respect to each piece of medical image data is the same as the previously described embodiments and modified examples. Once the tubular structure and the core line R51 are extracted, the structure extracting part 20 outputs information indicating the tubular structure as well as the core line R51 and medical image data corresponding to the information to the image generator 30.

The image generator 30 receives medical image data to which the information indicating the tubular structure and the core line R51 is linked from the structure extracting part 20. The image generator 30 outputs the information and the medical image data to the viewpoint position-identifying part 31.

Once the information indicating the tubular structure and the core line R51 as well as the medical image data are received, the viewpoint position-identifying part 31 analyses the information, verifies the observation object, and identifies an object position P52. The method of identifying the object position P52 is the same as in the previously described embodiments and modified examples.

Next, based on the positional information of the object position P52, the viewpoint position-identifying part 31 identifies the viewpoint position (that is, the one viewpoint position) for generating a fly-through image when viewing the observation object. Specifically, as shown in FIG. 12A, the viewpoint position-identifying part 31 identifies a position separated from the object position P52 by the distance L in a predetermined direction as the one viewpoint position P51a. Then, the direction for identifying the one viewpoint position P51a may be, for example, the direction of the tangent line R51a of the core line R51 at the object position P52 or the direction of a normal line of a cross-section formed by cutting the tubular structure at the object position P52.

Furthermore, the viewpoint position-identifying part 31, first determines the one viewpoint position P51 along the core line R51 and analyses, based on the information indicating the tubular structure, whether the observation object may be viewed from the one viewpoint position P51, that is, whether or not an obstacle (for example, the wall surface of the tubular structure) is present between the one viewpoint position P51 and the object position P52. Thereafter, if the observation object cannot be viewed from the one viewpoint position P51, as described above, the one viewpoint position P51a may be identified. It should be noted that in this case, needless to say, the method of identifying (identifying either one viewpoint position P51 or P51a) one viewpoint position should be consistent with regard to all image data.

Figure 12B:
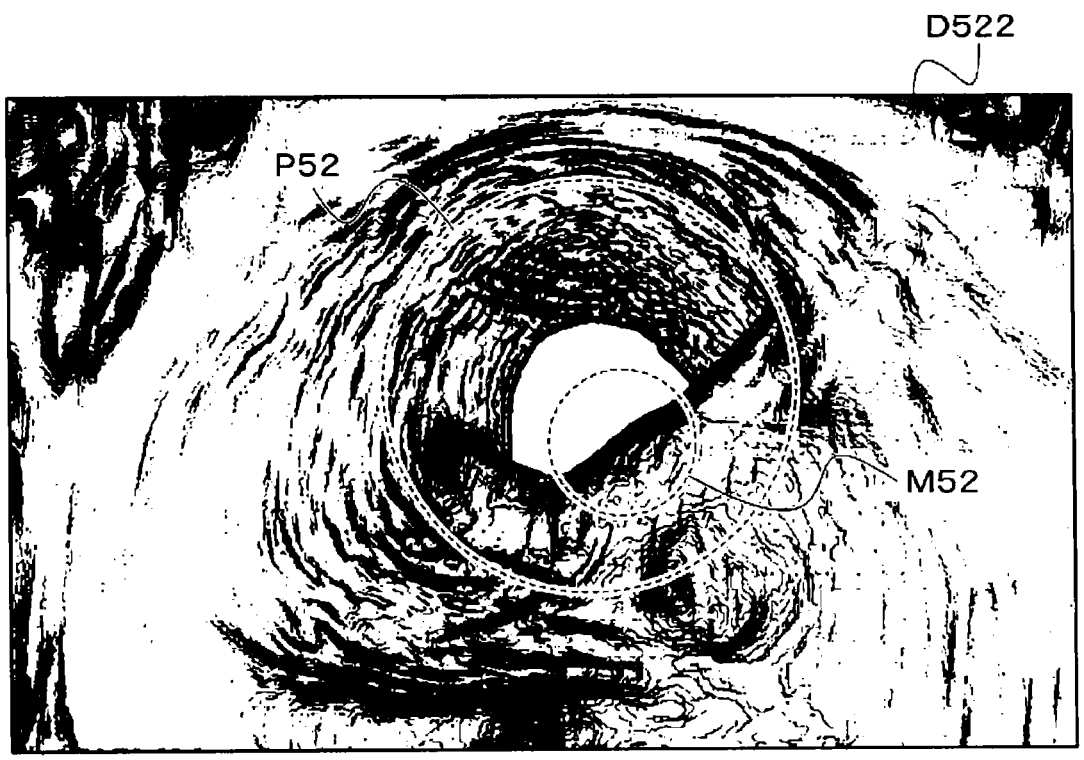
FIG. 12B is one example of a fly-through image displaying the inside of the large intestine.

Once the one viewpoint position P51a is identified, the viewpoint position-identifying part 31 outputs information indicating the viewpoint V51a when viewing the object position P52 from the identified one viewpoint position P51a and corresponding medical image data to the image processor 32. Based on the information indicating the viewpoint V51A and the medical image data, the image processor 32 generates a medical image (that is, a fly-through image), links the images to information indicating a timing point corresponding to medical image data of the generation source, and stores the images and the information in the image storage 40. FIG. 12B is one example of the medical image D522 (fly-through image) when viewing the object position P52 from the viewpoint V51a. P52 in FIG. 12B corresponds to the object position P52 in FIG. 12A. Furthermore, M52 corresponds to the portion M52 in FIG. 52A. As described, by providing the viewpoint V51a instead of the one viewpoint position P51 (ref. FIG. 12A), it becomes possible to obtain the medical image D522 when viewing the region M52 that is difficult to be observed from the one viewpoint position P51 blocked by the wall surface of the tubular structure.

The processes from hereinafter are the same as in the other embodiments and modified examples. That is, once the one viewpoint position P51a is identified with regard to all timing points and a series of medical images corresponding to a predetermined examination are stored in the image storage 40, the display controller 50 reads a series of medical images from the image storage 40. The display controller 50 uses information indicating the timing point incidental to each read medical image as a reference, arranges a series of medical images in chronological order, and generates a motion image. The display controller 50 causes the display of the U/I60 to display the generated motion image.

As described thus far, the medical image processing apparatus pertaining to Modified Example 3 identifies the position separated by the distance L from the object position P52 in a predetermined direction as the one viewpoint position P51a. Thereby, even if an observation object cannot be viewed from the one viewpoint position on the core line R51 such as a portion with a rapidly curved tubular structure like a large intestine or an aorta, it becomes possible to generate a medical image when viewing the observation object and obtain the same action effects as in the above embodiments and modified examples.

Modified Example 4

Figure 13A:
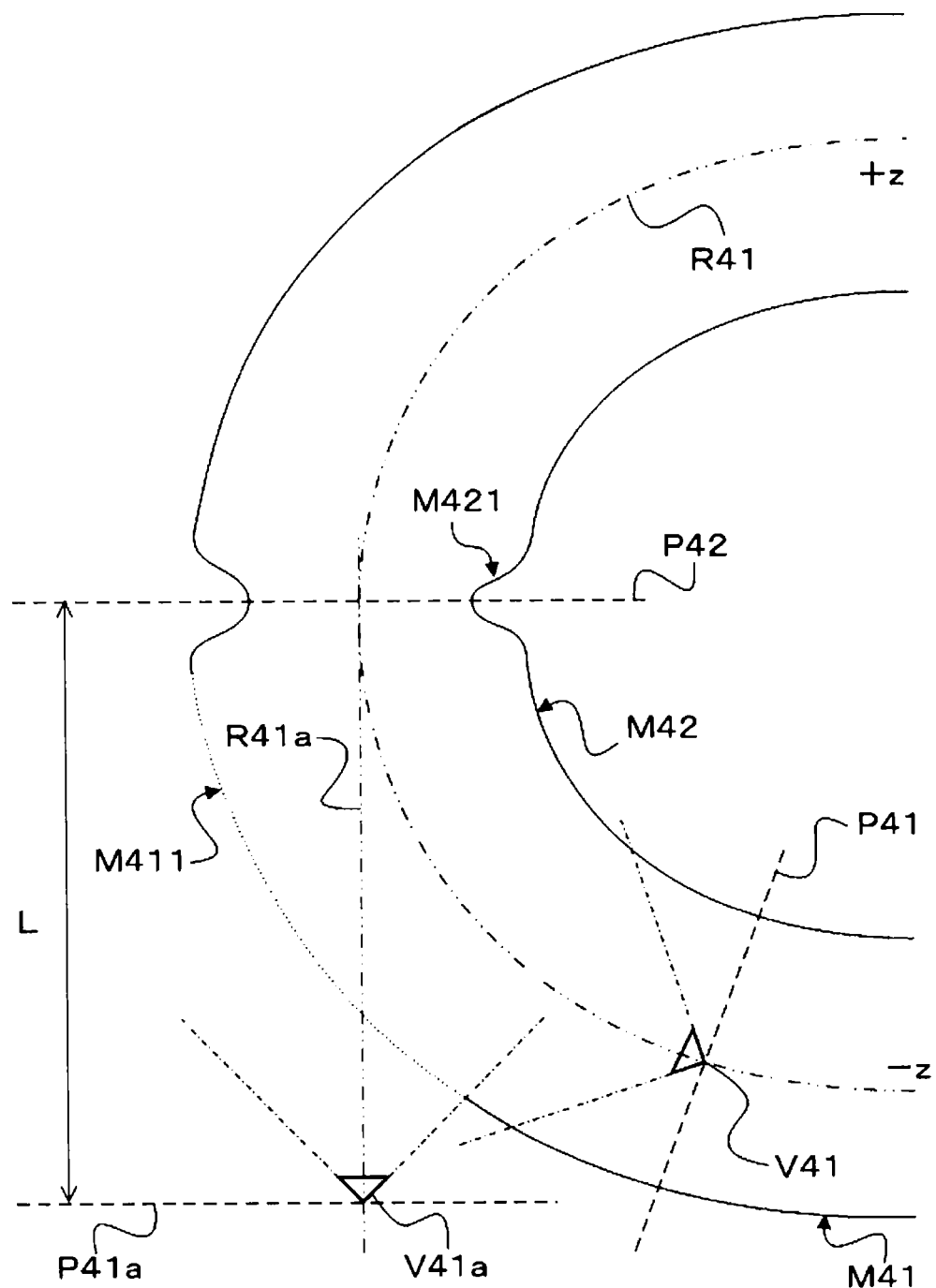
FIG. 13A explains a method of identifying one viewpoint position pertaining to Modified Example 4.

Next, the medical image processing apparatus pertaining to Modified Example 4 is described. An example of identifying the one viewpoint position within a tubular structure was described in Modified Example 3. However, if the tubular structure is further bent in comparison to the example shown in Modified Example 3, sometimes a position separated from an object position by the distance L ends up being outside the tubular structure. Such a situation is described specifically with reference to FIG. 13A. FIG. 13A is an example schematically showing the structure of the aorta shown in FIG. 10A. An object position P42 in FIG. 13A is equivalent to the object position P42 in FIG. 10A. Moreover, the one viewpoint position P41 is equivalent to the one viewpoint position P41 in FIG. 10A and, R41 is equivalent to the core line R41 in FIG. 10A. Furthermore, M41 and M42 in FIG. 13A show a wall surface of the tubular structure.

A viewpoint V41 is set as the one viewpoint position P41 to generate a fly-through image when viewing the object position P42. In this case, a region M421 on the wall surface M42 on the inner circumference side in the tubular structure is blocked by the wall surface M42 on the upstream side of the region 421 and is difficult to be observed from the viewpoint V41. On the other hand, as shown in Modified Example 3, a position separated from the object position P42 by the distance L in the tangent line direction of the core line R41 is presumed to be the one viewpoint position P41a. In this case, as shown in FIG. 13A, the one viewpoint position P41a ends up being outside the tubular structure. Therefore, due to the blockage by the wall surface M41 of the outer circumference of the tubular structure, it becomes difficult to view the object position P42 from the viewpoint V41a provided at the one viewpoint position P41a.

Figure 13B:
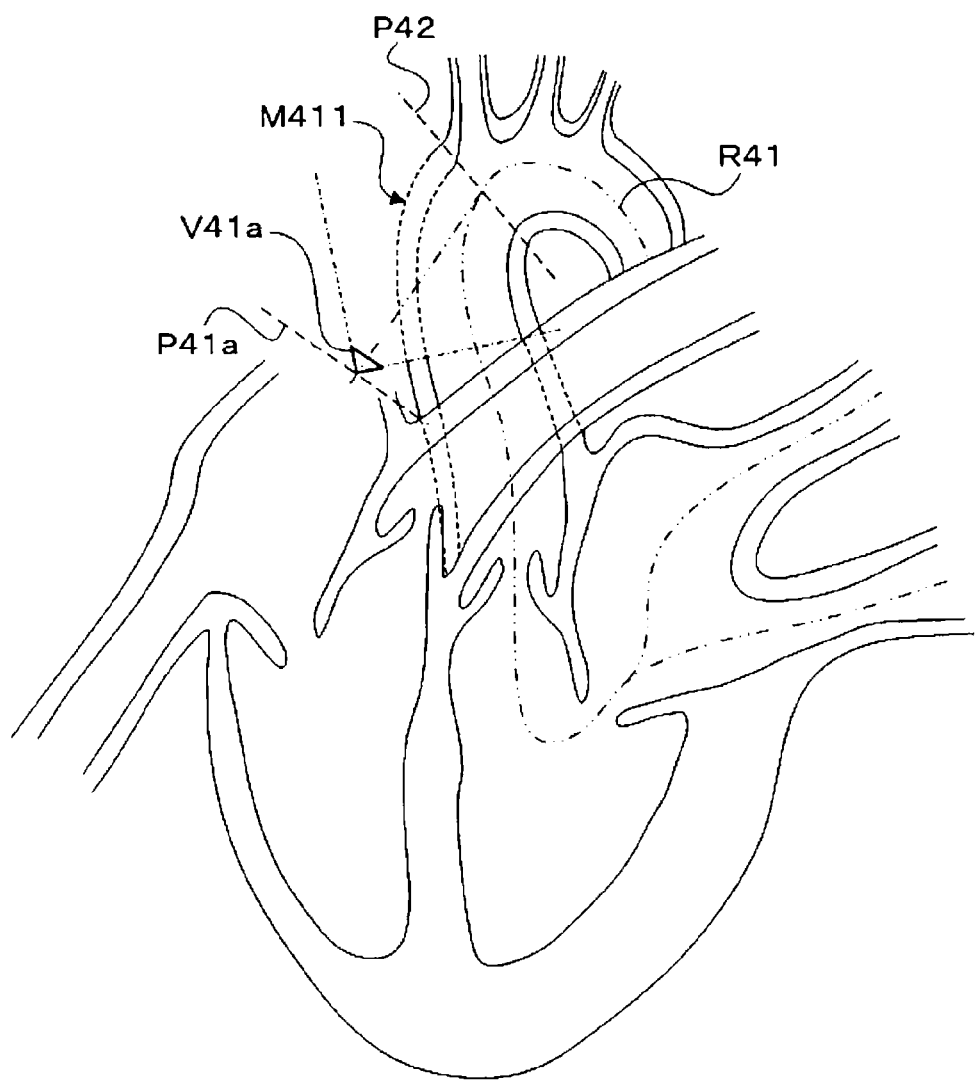
FIG. 13B indicates the outline of a heart and an aorta for explaining the method of identifying one viewpoint position pertaining to Modified Example 4.

Incidentally, as shown in FIG. 13A, the medical image processing apparatus pertaining to Modified Example 4 makes it possible to set the viewpoint V41a at the one viewpoint position P41a outside the tubular structure and generates a medical image when viewing the object position P42 by not allowing a region M411 to be displayed which blocks the field of view of the viewpoint V41 in the wall surface of the tubular structure. Hereinafter, operations of the medical image processing apparatus pertaining to Modified Example 4 are described focusing on areas that are different from Modified Example 3 by taking the example of the aorta that is shown in FIG. 13A and FIG. 13B. FIG. 13B is a drawing explaining the method of identifying the one viewpoint position pertaining to Modified Example 4 and the outline of the heart and the aorta are shown therein.

The structure extracting part 20 respectively reads medical image data at a plurality of timing points corresponding to a predetermined examination. The structure extracting part 20 instructs the tubular structure-extracting part 21 and the core line-extracting part 22 to identify a tubular structure and a core line with respect to the read medical image data. Thereby, a tubular structure and a core line R41 are identified with regard to each piece of image data. The method of extracting the tubular structure and the core line with respect to each medical image data is the same as in the previously described embodiments and modified examples. Once the tubular structure and the core line R41 are extracted, the structure extracting part 20 outputs information indicating the tubular structure as well as the core line R41 and medical image data corresponding to the information to the image generator 30.

The image generator 30 receives medical image data to which the information indicating the tubular structure and the core line R41 is linked from the structure extracting part 20. The image generator 30 outputs the information and the medical image data to the viewpoint position-identifying part 31.

Once the information indicating the tubular structure and the core line R41 as well as the medical image data are received, the viewpoint position-identifying part 31 analyses the information, verifies the observation object, and identifies the object position P42. The method of identifying the object position P42 is the same as the previously described embodiments and modified examples.

Next, based on the positional information of the object position P42, the viewpoint position-identifying part 31 identifies the viewpoint position (that is, the one viewpoint position) for generating a fly-through image when viewing the observation object. Specifically, as shown in FIG. 13A and FIG. 13B, the viewpoint position-identifying part 31 identifies a position separated from the object position P42 by the distance L in a predetermined direction as the one viewpoint position P41a. Then, the direction for identifying the one viewpoint position P41a may be, as in Modified Example 3, the direction of the tangent line R41a of the core line R41 at the object position P42 or the direction of a normal line of a cross-section formed by cutting the tubular structure at the object position P42. Then, as shown in FIG. 13A or FIG. 13B, the one viewpoint position P41a is presumed to be located outside the tubular structure.

It should be noted that the viewpoint position-identifying part 31 first determines the one viewpoint position P41 along the core line R41 and analyses, based on the information indicating the tubular structure, whether the observation object may be viewed from the one viewpoint position P41, that is, whether or not an obstacle (for example, the wall surface of a tubular structure) is present between the one viewpoint position P41 and the object position P42. Thereafter, if the observation object cannot be viewed from the one viewpoint position P41, as described above, the one viewpoint position P41a may be identified. It should be noted that in this case, needless to say, the method of identifying (identifying which of one viewpoint position either P41 or P41a is to be identified) the one viewpoint position should be consistent with regard to each piece of image data.

Once the one viewpoint position P41a is identified, first, the viewpoint position-identifying part 31 identifies the viewpoint V41a when viewing the object position P42 from the one viewpoint position P41a. Furthermore, the viewpoint position-identifying part 31 compares the information indicating a tubular structure and the coordinates of the one viewpoint position P41a and determines if the position is present, whether inside or outside the tubular structure. As shown in FIG. 13A and FIG. 13B, if the coordinates of the one viewpoint position P41a end up being outside the tubular structure, based on the coordinates of the one viewpoint position P41a, the field of view angle of the viewpoint V41a, and information indicating the tubular structure, the viewpoint position-identifying part 31 identifies a region M411 overlapping the field of view of the viewpoint V41a in the wall surface of the tubular structure. That is, when viewing the object position P42 from the viewpoint V41a, the region M411 becomes an area that blocks the field of vision. The viewpoint position-identifying part 31 outputs information indicating the identified viewpoint V41a, information indicating the region M411, and medical image data corresponding thereto, to the image processor 32. It should be noted that operations for cases in which the coordinates of the one viewpoint position P41a end up being inside the tubular structure are the same as in Modified Example 3, including the operations of the image processor 32 that are described later.

Figure 13C:
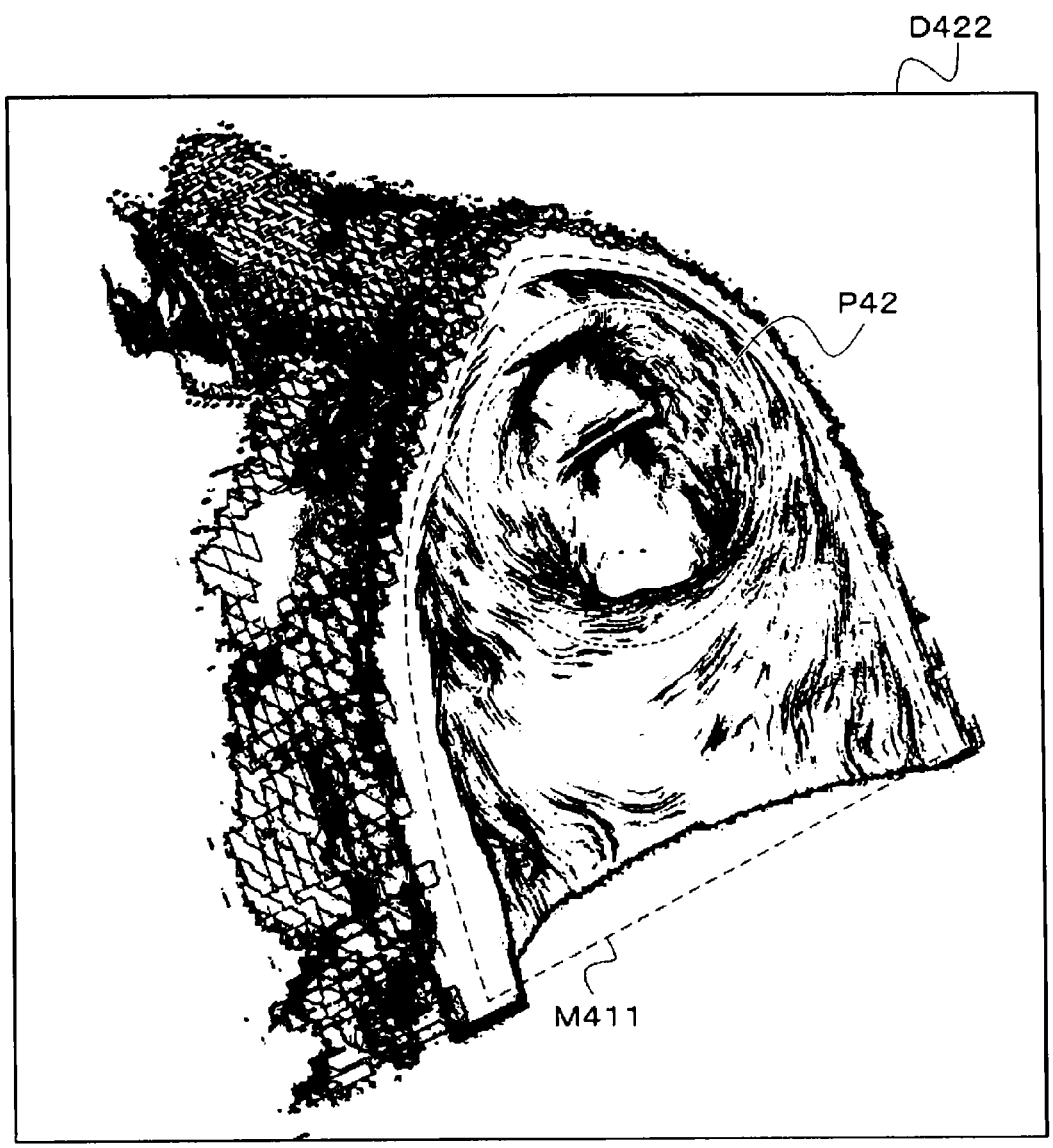
FIG. 13C is one example of an image displaying the inside of the aorta.

Based on the information indicating the viewpoint V41a and the medical image data, the image processor 32 generates medical images (that is, fly-through images). Then, based on the information indicating the region M411, a portion equivalent to the region M411 in the wall surface of the tubular structure is not displayed by the image processor 32. FIG. 13C shows one example of a medical image D422 when viewing the object position P42 inside the tubular structure from the viewpoint V41a located outside the tubular structure. As shown in FIG. 13C, by not showing the region M411 interposing between the viewpoint V41a and the object position P42 in the wall surface of the tubular structure, it becomes possible to view the object position P42 from the viewpoint V41a located outside the tubular structure. The image processor 32 links information indicating a timing point corresponding to the medical image data of the generation source to the generated medical image and causes the image storage 40 to store the images and information.

The processes hereinafter are the same as other embodiments and modified examples. That is, once the one viewpoint position P41a is identified with regard to all timing points and a series of medical images corresponding to a predetermined examination are stored in the image storage 40, the display controller 50 reads a series of medical images from the image storage 40. The display controller 50 uses information indicating the timing point incidental to each read medical image as a reference, arranges a series of medical images in chronological order, and generates a motion image. The display controller 50 causes the display of the U/I60 to display the generated motion image.

As described thus far, if one viewpoint position P41a is located outside the tubular structure, the medical image processing apparatus pertaining to Modified Example 4 identifies a region M411 that blocks the field of vision from the viewpoint V41a set at the one viewpoint position P41a such that it is not displayed. Thereby, even if the one viewpoint position P41a is located outside the tubular structure, it becomes possible to generate medical images when viewing an observation object and obtain the same action effects as in the above embodiments and modified examples.

While certain embodiments have been described, these embodiments have been presented by way of example only, and are not intended to limit the scope of the inventions. Indeed, the novel systems described herein may be embodied in a variety of their forms; furthermore, various omissions, substitutions and changes in the form of the systems described herein may be made without departing from the spirit of the inventions. The accompanying claims and their equivalents are intended to cover such forms or modifications as would fall within the scope and spirit of the inventions.

What is claimed is:

1. A medical image processing apparatus, comprising:
an image data storage that stores a plurality of medical image data obtained by imaging inside of a subject at each of a plurality of predetermined timing points,
a structure identifying part configured to identify a tubular structure inside the subject and a core line in an axial direction of the tubular structure based on the medical image data,
an image generator configured to designate a position of a predetermined observation object in the tubular structure for each of the medical image data, to designate a viewpoint position at a constant distance from the position of the redetermined observation object designated for each of the medical image data along the core line, and to generate medical images representing the inside of the tubular structure when viewing the predetermined observation object from the viewpoint position at the constant distance from the predetermined observation object inside the tubular structure based on the medical image data corresponding to the timing points,
a display, and
a display controller configured to cause the display to display the medical images generated for each of the medical image data corresponding to each of the timing points.

2. The medical image processing apparatus according to claim 1, wherein the image generator is configured to, in response to designation of the position of the predetermined observation object for each of the medical image data corresponding to each of the timing points, identify the viewpoint position corresponding to the constant distance for each designated position of the observation object.

3. The medical image processing apparatus according to claim 1, wherein the image generator is configured to, in response to designation of the position of the predetermined observation object for medical image data corresponding to a predetermined timing point, detect an observation object having the same form characteristics as those of the predetermined observation object for each of the medical image data at each of the timing points, to identify a position at which the form characteristics are detected as a position of the observation object in each of the medical image data, and further to identify a position separated from the position of the observation object by the constant distance as the viewpoint position.

4. The medical image processing apparatus according to claim 1, wherein, for each of the timing points, the image generator is configured to identify another viewpoint position located on the opposite side from the viewpoint position along the core line from the position of the observation object, and respectively generates the medical images viewing the position of the observation object with regard to the viewpoint position and the another viewpoint position, and, for each of the timing points, the display controller is configured to cause the display to sequentially display the medical images respectively generated with regard to the viewpoint position and the another viewpoint position corresponding to the timing point.

5. The medical image processing apparatus according to claim 4, wherein, among the medical images respectively generated with regard to the viewpoint position and the another viewpoint position, the display controller is configured to invert one of the medical images left to right and causes the display to display the image.

6. The medical image processing apparatus according to claim 1, wherein the image generator is configured to designate the observation object based on form characteristics in the tubular structure with respect to medical image data corresponding to each of the timing points.

7. A medical image processing apparatus, comprising:
an image data storage that stores a plurality of medical image data obtained by imaging inside of a subject at each of a plurality of timing points,
a structure identifying part configured to identify a tubular structure inside the subject and a core line in an axial direction of the tubular structure based on the medical image data,
an image generator configured to designate a first position of a predetermined observation object in the tubular structure with respect to first medical image data corresponding to a predetermined timing point, specify a first viewpoint position at a predetermined distance from the observation object based on the first medical image data, generate a medical image when the observation object is viewed from the first viewpoint position as a reference medical image, with respect to second medical image data corresponding to another timing point different from the predetermined timing point, designate a second position of the observation object at the other timing point, specify a second viewpoint position at a predetermined distance from the second position, and generate a medical image when the observation object is viewed from the second viewpoint position specified,
a display, and
a display controller configured to cause the display to display the reference medical image and the medical image generated at the predetermined timing point and the other timing point.

8. The medical image processing apparatus according to claim 7, wherein,
for each of the timing points, the image generator is configured to identify another viewpoint position located on the opposite side from the first viewpoint position and the second viewpoint position along the core line from the position of the observation object, and generates the medical image viewing the position of the observation object with regard to each of the first viewpoint position, the second viewpoint position, and the another viewpoint position, and,
for each of the timing points, the display controller causes the display to sequentially display the medical image generated with regard to each of the first viewpoint position, the second viewpoint position, and the another viewpoint position corresponding to the timing point.

9. The medical image processing apparatus according to claim 8, wherein among medical images generated with regard to the first viewpoint position, the second viewpoint position, and the another viewpoint position, the display controller is configured to invert one of the medical images left to right and causes the display to display the image.

10. The medical image processing apparatus according to claim 7, wherein,
the image generator is configured to designate the second position of the observation object with respect to the second medical image data corresponding to the another timing point different from the predetermined timing point, and generate a second medical image based on the second medical image data while changing a viewpoint position along the core line in the second medical image data, and
the image generator is further configured to set a viewpoint position, where size of the second medical image corresponds to size of a first medical image based on the first medical image data, as the second viewpoint position, and designate the second medical image in the second viewpoint position.

11. The medical image processing apparatus according to claim 7, wherein in response to designation of a position of the observation object with respect to medical image data corresponding to each of the timing points, the image generator designates a viewpoint position corresponding to the predetermined distance for the position of the observation object designated.

12. The medical image processing apparatus according to claim 7, wherein the image generator is configured to designate the observation object based on form characteristics in the tubular structure with respect to medical image data corresponding to each of the timing points.

* * * * *